(12) United States Patent
Hara et al.

(10) Patent No.: US 12,301,071 B2
(45) Date of Patent: May 13, 2025

(54) MOTOR CONTROL DEVICE, MECHATRONIC UNIT, POWER GENERATION SYSTEM, BOOST CONVERTER SYSTEM, AND ELECTRIC VEHICLE SYSTEM

(71) Applicant: Hitachi, Ltd., Tokyo (JP)

(72) Inventors: Takafumi Hara, Tokyo (JP); Makoto Ito, Tokyo (JP); Akeshi Takahashi, Tokyo (JP); Toshiyuki Ajima, Tokyo (JP)

(73) Assignee: HITACHI, LTD., Tokyo (JP)

( * ) Notice: Subject to any disclaimer, the term of this patent is extended or adjusted under 35 U.S.C. 154(b) by 253 days.

(21) Appl. No.: 18/009,894

(22) PCT Filed: Mar. 1, 2021

(86) PCT No.: PCT/JP2021/007720
§ 371 (c)(1),
(2) Date: Dec. 12, 2022

(87) PCT Pub. No.: WO2022/014083
PCT Pub. Date: Jan. 20, 2022

(65) Prior Publication Data
US 2023/0223824 A1    Jul. 13, 2023

(30) Foreign Application Priority Data
Jul. 15, 2020   (JP) .................................. 2020-121077

(51) Int. Cl.
*H02K 11/33*   (2016.01)
*H02K 7/116*   (2006.01)
(Continued)

(52) U.S. Cl.
CPC ............. *H02K 11/33* (2016.01); *H02K 7/116* (2013.01); *H02M 7/48* (2013.01); *H02P 21/06* (2013.01); *H02P 27/08* (2013.01)

(58) Field of Classification Search
CPC ......... H02K 11/33; H02K 7/116; H02M 7/48; H02P 21/06; H02P 27/08
See application file for complete search history.

(56) References Cited

U.S. PATENT DOCUMENTS

2010/0110743 A1 * 5/2010 Yamasaki ......... H02M 7/53873
                                                          332/109
2010/0164416 A1   7/2010 Yamada
2019/0348938 A1 * 11/2019 Takahashi ............... H02P 29/40

FOREIGN PATENT DOCUMENTS

JP    2008-178166 A    7/2008
JP    2009-11028 A     1/2009
(Continued)

OTHER PUBLICATIONS

Translation of JP2010213485 has been attached.*
International Search Report, PCT/JP2021/007720 dated May 11, 2021. 4 pages.

*Primary Examiner* — Zoheb S Imtiaz
(74) *Attorney, Agent, or Firm* — Volpe Koenig

(57) ABSTRACT

A motor control device of the present invention is connected to a power converter for converting power from direct current power to alternating current power, and controls the drive of an alternating current motor that is driven using said alternating current power, and the motor control device is provided with: a carrier wave generator; a carrier wave frequency adjuster that adjusts the frequency of the carrier wave; and a gate signal generator that uses the carrier wave to pulse width modulate a voltage command according to a torque command, and generates a gate signal for controlling operation of the power converter, wherein the carrier wave (Continued)

frequency adjuster adjusts the voltage command and carrier wave phase difference to reduce eddy current loss generated in rotor magnets of the alternating current motor according to a d-axis current flowing to the alternating current motor and the rotational speed of the alternating current motor.

15 Claims, 17 Drawing Sheets

(51) Int. Cl.
*H02M 7/48* (2007.01)
*H02P 21/06* (2016.01)
*H02P 27/08* (2006.01)

(56) References Cited

FOREIGN PATENT DOCUMENTS

| | | | |
|---|---|---|---|
| JP | 2010-213485 A | | 9/2010 |
| JP | 2010213485 | * | 9/2010 |
| JP | 2013-034315 A | | 2/2013 |
| JP | 2020-099114 A | | 6/2020 |

* cited by examiner

MOTOR CONTROL DEVICE, MECHATRONIC UNIT, POWER GENERATION SYSTEM, BOOST CONVERTER SYSTEM, AND ELECTRIC VEHICLE SYSTEM

TECHNICAL FIELD

The present invention relates to a motor control device, a mechatronic unit, a power generation system, a boost converter system, and an electric vehicle system.

BACKGROUND ART

A driving motor used for an electric vehicle or a hybrid vehicle is required to have a large output and a high torque response. Therefore, a permanent magnet rotary electric machine (hereinafter, referred to as a motor) using a rare earth sintered magnet retaining strong energy is generally driven by an inverter. The inverter converts a DC voltage from a DC power supply into a line voltage (AC voltage) of an arbitrary voltage and frequency by pulse width modulation (PWM) control, and drives the motor at a variable speed. For example, when considering use in an electric vehicle, motors are concentrated on a relatively small load side in urban traveling, high output is required on a large load side in acceleration at the time of overtaking or merging and traveling on an expressway, and large torque is required at low speed on a steep slope. As described above, in the motor for an electric vehicle, the load of the motor frequently changes according to the traveling state, and the calorific value of the motor also changes, so that the motor continues to change in temperature. When the magnet temperature of the motor is high and the weak magnetic flux current is applied to the motor by a predetermined current or more, irreversible demagnetization occurs in which the permanent magnet does not generate the original magnetic flux. As a result, torque characteristics of the motor change, and it becomes difficult to control traveling.

PTL 1 proposes a motor drive system that detects a ripple current width of a motor current controlled according to PWM control, sets a reference value of the ripple current width, and controls a frequency of a carrier wave used for PWM control on the basis of comparison between the ripple current width and the ripple current width, thereby realizing feedback control of the carrier wave frequency for maintaining the ripple current width at an appropriate level. This prevents the occurrence of demagnetization due to an increase in magnet temperature in an alternating-current motor while preventing an increase in power loss due to an increase in the number of switching operations.

CITATION LIST

Patent Literature

PTL 1: JP 2009-11028 A

SUMMARY OF INVENTION

Technical Problem

In the technique described in PTL 1, there is a problem that a switching loss of an inverter increases in a case where a change such as improvement in a switching frequency is involved.

Solution to Problem

According to an aspect of the present invention, there is provided a motor control device connected to a power converter for converting power from DC power to AC power, and controlling driving of an AC motor driven using the AC power, the motor control device including: a carrier wave generation unit that generates a carrier wave; a carrier wave frequency adjustment unit that adjusts a frequency of the carrier wave; and a gate signal generation unit that performs pulse width modulation on a voltage command according to a torque command using the carrier wave and generates a gate signal for controlling an operation of the power converter, in which the carrier wave frequency adjustment unit adjusts a phase difference between the voltage command and the carrier wave so as to reduce an eddy current loss generated in a magnet of a rotor of the AC motor according to a d-axis current applied to the AC motor and a rotational speed of the AC motor.

According to another aspect of the present invention, there is provided a mechatronic unit including: a motor control device; the power converter connected to the motor control device; the AC motor driven by the power converter; and a gear that transmits a rotational driving force of the AC motor, in which the AC motor, the power converter, and the gear are integrated.

According to still another aspect of the present invention, there is provided a power generation system including: a motor control device; the power converter connected to the motor control device; the AC motor driven by the power converter; and an engine system connected to the AC motor.

According to still another aspect of the present invention, there is provided a boost converter system including: a motor control device; the power converter connected to the motor control device; the AC motor driven by the power converter; and a boost converter that boosts a voltage of the DC power.

According to still another aspect of the present invention, there is provided an electric vehicle system including: a motor control device; the power converter connected to the motor control device; and the AC motor driven by the power converter, in which the electric vehicle system travels using a rotational driving force of the AC motor.

Advantageous Effects of Invention

According to the present invention, it is possible to prevent occurrence of irreversible demagnetization of a motor while suppressing a switching loss of an inverter.

DESCRIPTION OF EMBODIMENTS

First Embodiment

Hereinafter, a first embodiment of the present invention will be described with reference to the drawings.

Figure 1:
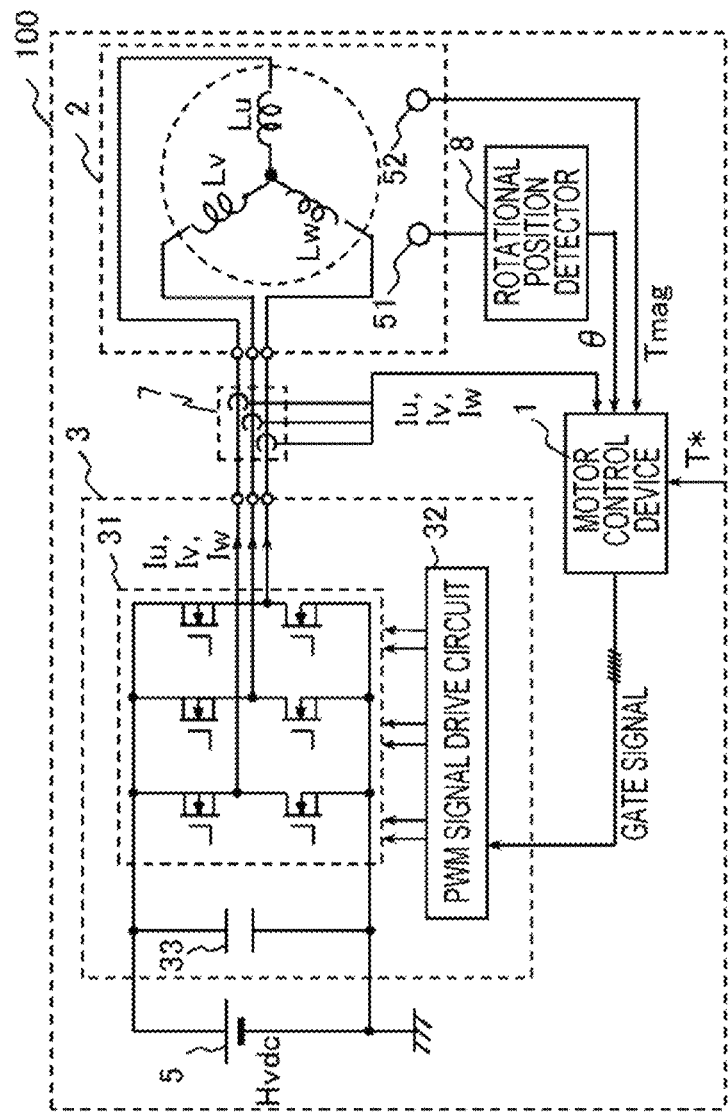
FIG. 1 is an overall configuration diagram of a motor drive system including a motor control device according to an embodiment of the present invention.

FIG. 1 is a configuration diagram of a motor drive system including a motor control device according to an embodiment of the present invention. The motor drive system 100 includes a motor control device 1, a motor 2, an inverter 3, a high-voltage battery 5, a current detection unit 7, and a rotational position detector 8.

A rotational position θ of the motor 2 is input from the rotational position detector 8 to the motor control device 1. A magnet temperature Tmag representing a temperature of a magnet in the rotor of the motor 2 is input from a temperature sensor 52 attached to the motor 2. Furthermore, Iu, Iv, and Iw representing three-phase AC currents flowing through the motor 2 are input from the current detection unit 7, and a torque command T* is input from a host control device (not illustrated). The motor control device 1 generates a gate signal for controlling the drive of the motor 2 on the basis of the input information, and outputs the gate signal to the inverter 3. Thus, the operation of the inverter 3 is controlled, and the driving of the motor 2 is controlled. Details of the motor control device 1 will be described later.

The inverter 3 includes an inverter circuit 31, a PWM signal drive circuit 32, and a smoothing capacitor 33. The PWM signal drive circuit 32 generates a PWM signal for controlling each switching element included in the inverter circuit 31 on the basis of the gate signal input from the motor control device 1, and outputs the PWM signal to the inverter circuit 31. The inverter circuit 31 includes switching elements respectively corresponding to the upper arm and the lower arm of the U phase, the V phase, and the W phase. By controlling each of these switching elements according to the PWM signal input from the PWM signal drive circuit 32, the DC power supplied from the high-voltage battery 5 is converted into AC power and output to the motor 2. The smoothing capacitor 33 smooths the DC power supplied from the high-voltage battery 5 to the inverter circuit 31.

The high-voltage battery 5 is a DC voltage source of the motor drive system 100, and outputs a power supply voltage Hvdc to the inverter 3. The power supply voltage Hvdc of the high-voltage battery 5 is converted into a pulsed three-phase AC voltage having a variable voltage and a variable frequency by the inverter circuit 31 and the PWM signal drive circuit 32 of the inverter 3, and is applied to the motor 2 as a line voltage. As a result, the AC power is supplied from the inverter 3 to the motor 2 on the basis of the DC power of the high-voltage battery 5. Note that the power supply voltage Hvdc of the high-voltage battery 5 varies depending on the state of charge thereof.

The motor 2 is a three-phase synchronous motor rotationally driven by the AC power supplied from the inverter 3, and includes a stator and a rotor. In the present embodiment, a surface permanent magnet synchronous motor (SPMSM) in which a permanent magnet such as a neodymium magnet or a ferrite magnet is attached to a surface of a rotor is used as the motor 2. When the AC power input from the inverter 3 is applied to the three-phase coils Lu, Lv, and Lw provided in the stator, the three-phase AC currents Iu, Iv, and Iw are conducted in the motor 2, and a magnetic flux is generated in each coil. When attractive force and repulsive force are generated between the magnetic flux of each coil and the magnetic flux of the permanent magnet disposed in the rotor, torque is generated in the rotor, and the motor 2 is rotationally driven.

A rotational position sensor 51 for detecting the rotational position θ of the rotor is attached to the motor 2. The rotational position detector 8 calculates the rotational position θ from the input signal of the rotational position sensor 51. The calculation result of the rotational position θ by the rotational position detector 8 is input to the motor control device 1, and is used in the phase control of the AC power performed by the motor control device 1 generating the gate signal in accordance with the phase of the induced voltage of the motor 2.

Here, a resolver including an iron core and a winding is more suitable as the rotational position sensor 51, but a sensor using a magnetoresistive element such as a GMR sensor or a Hall element has no problem. Further, the rotational position detector 8 may estimate the rotational position θ by using the three-phase AC currents Iu, Iv, and Iw flowing through the motor 2 and the three-phase AC voltages Vu, Vv, and Vw applied from the inverter 3 to the motor 2 without using the input signal from the rotational position sensor 51.

The motor 2 is provided with the temperature sensor 52 that detects the magnet temperature Tmag from the viewpoint of suppressing demagnetization of the magnet attached to the rotor. Note that a magnet temperature estimation unit may be provided in the motor drive system 100, and the magnet temperature estimation unit may estimate the magnet temperature Tmag using the temperature dependency of the induced voltage induced by the rotation of the motor 2, or may estimate the magnet temperature Tmag using a thermal network.

Hereinafter, an example of a method of estimating the magnet temperature Tmag will be described using Equations (1) to (3). Equations (1) and (2) represent a dq-axis voltage equation of the motor. In Equation (1) and Equation (2), a winding resistance R, an electrical angular frequency ω, and dq-axis inductances Ld and Lq can be regarded as being substantially unchanged with respect to the temperature. Meanwhile, the dq-axis voltages Vd and Vq and the dq-axis currents Id and Iq are fluctuation parameters. The dq-axis currents Vd and Vq can be derived from the three-phase AC currents Iu, Iv, and Iw of the motor 2 by using the rotational position θ and calculating the dq-axis voltages Id and Iq from dq-axis voltage commands Vd* and Vq* described later, respectively.

$$Vd = R*Id - \omega*Lq*Iq \quad (1)$$

$$Vq = R*Iq + \omega*Ld*Id + \omega*Ke \quad (2)$$

Here, Vd and Vq are dq-axis voltages, Id and Iq are dq-axis currents, Ld and Lq are dq-axis inductances, ω is an electrical angular frequency, Ke is an induced voltage constant, and R is a winding resistance.

Equation (3) illustrates the temperature dependency of the induced voltage. It can be seen that when the temperature of the rotor varies from a normal temperature T_nomi, the induced voltage varies linearly accordingly.

$$Ke = Ke\_nomi + (T - T\_nomi)*K \quad (3)$$

Here, Ke_nomi is an induced voltage constant at the normal temperature, T is a rotor temperature, T_nomi is the normal temperature of the rotor, and K is a temperature-dependent slope of the induced voltage.

In the equation of the q-axis voltage Vq of Equation (2), the induced voltage constant Ke can be derived from the known parameter. The induced voltage constant Ke has temperature dependency and does not necessarily coincide with the induced voltage constant Ke_nomi at normal temperature. Meanwhile, in Equation (3), the induced voltage constant Ke_nomi at the normal temperature and the normal temperature T_nomi of the rotor are known. Therefore, the rotor temperature T can be estimated from Equation (3) using the induced voltage constant Ke obtained by Equation (2). Thus, the rotor temperature T can be estimated, and the magnet temperature Tmag can be estimated using the estimation result.

A current detection unit 7 is disposed in a current path between the inverter 3 and the motor 2. The current detection unit 7 detects three-phase AC currents Iu, Iv, and Iw (U-phase AC current Iu, V-phase AC current Iv, and W-phase AC current Iw) that energize the motor 2. The current detection unit 7 is configured using, for example, a Hall current sensor or the like. Detection results of the three-phase AC currents Iu, Iv, and Iw by the current detection unit 7 are input to the motor control device 1, and are used for generation of a gate signal performed by the motor control device 1. Although FIG. 1 illustrates an example in which the current detection unit 7 includes three current detectors, two current detectors may be provided, and the AC current of the remaining one phase may be calculated from the fact that the sum of the three-phase AC currents Iu, Iv, and Iw is zero. The pulsed DC flowing from the high-voltage battery 5 into the inverter 3 may be detected by a shunt resistor or the like inserted between the smoothing capacitor 33 and the inverter 3, and the three-phase AC currents Iu, Iv, and Iw may be obtained based on the DC and the three-phase AC voltages Vu, Vv, and Vw applied from the inverter 3 to the motor 2.

Figure 2:
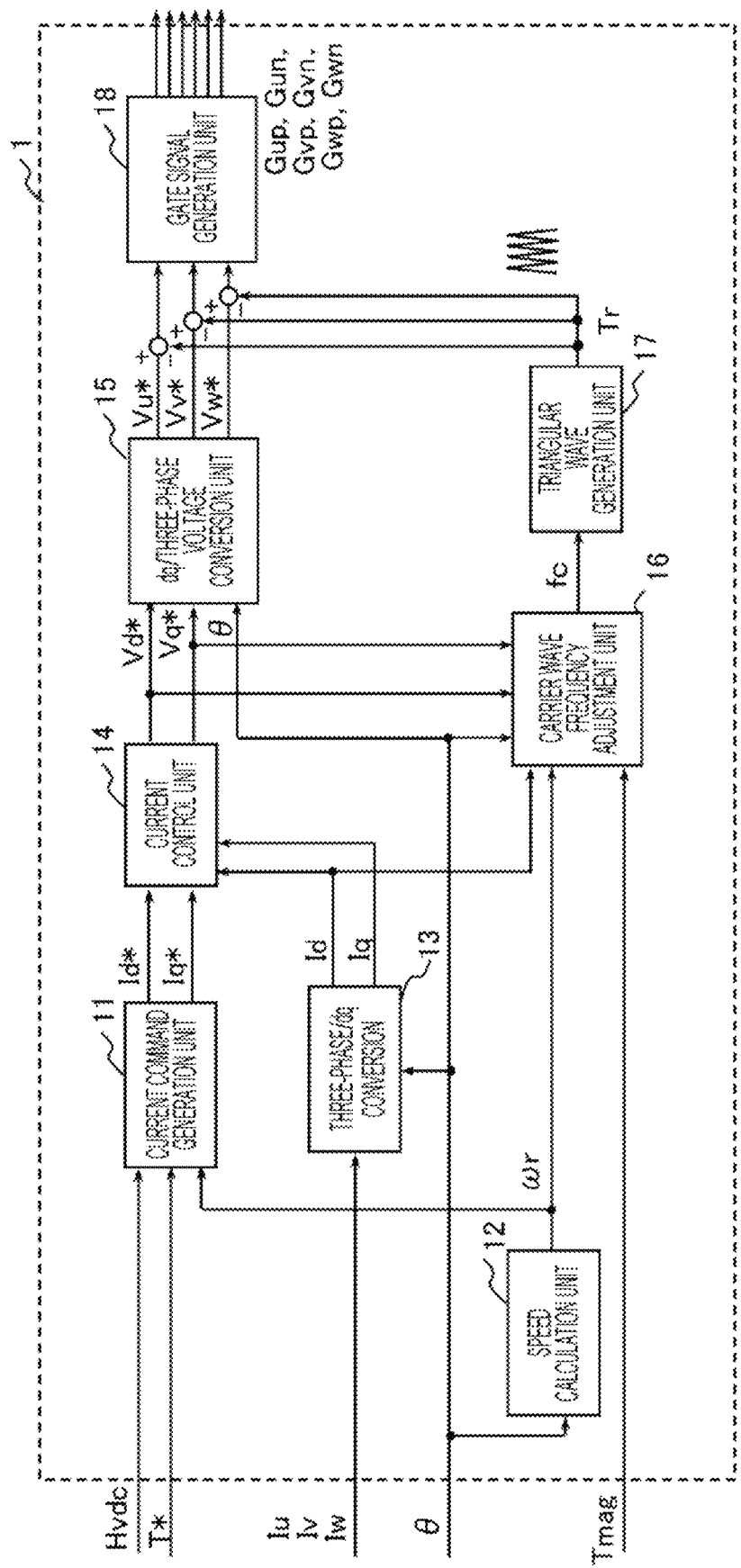
FIG. 2 is a block diagram illustrating a functional configuration of the motor control device according to the first embodiment of the present invention.

Next, details of the motor control device 1 will be described. FIG. 2 is a block diagram illustrating a functional configuration of the motor control device 1 according to the first embodiment of the present invention.

As illustrated in FIG. 2, the motor control device 1 includes functional blocks of a current command generation unit 11, a speed calculation unit 12, a three-phase/dq conversion unit 13, a current control unit 14, a dq/three-phase voltage conversion unit 15, a carrier wave frequency adjustment unit 16, a triangular wave generation unit 17, and a gate signal generation unit 18. The motor control device 1 includes, for example, a microcomputer, and can implement these functional blocks by executing a predetermined program in the microcomputer. Alternatively, some or all of these functional blocks may be realized using a hardware circuit such as a logic IC or an FPGA.

The current command generation unit 11 calculates the d-axis current command Id* and the q-axis current command Iq* based on the input torque command T* and the power supply voltage Hvdc. Here, for example, the d-axis current command Id* and the q-axis current command Iq* according to the torque command T* are obtained using a preset current command map, a mathematical expression representing the relationship between the d-axis current Id and the q-axis current Iq and the motor torque, or the like.

The speed calculation unit 12 calculates a motor rotational speed ωr representing the rotational speed (number of revolutions) of the motor 2 from the temporal change of the rotational position θ. The motor rotational speed ωr may be a value represented by either an angular speed (rad/s) or a number of revolutions (rpm). In addition, these values may be mutually converted and used.

The three-phase/dq conversion unit 13 performs dq conversion based on the rotational position θ obtained by the rotational position detector 8 on the three-phase AC currents Iu, Iv, and Iw detected by the current detection unit 7, and calculates a d-axis current value Id and a q-axis current value Iq.

The current control unit 14 calculates the d-axis voltage command Vd* and the q-axis voltage command Vq* according to the torque command T* based on deviations between the d-axis current command Id* and the q-axis current command Iq* output from the current command generation unit 11 and the d-axis current value Id and the q-axis current value Iq output from the three-phase/dq conversion unit 13 so that these values match with each other. Here, for example, by a control method such as PI control, the d-axis voltage command Vd* according to the deviation between the d-axis current command Id* and the d-axis current value Id and the q-axis voltage command Vq* according to the deviation between the q-axis current command Iq* and the q-axis current value Iq are obtained.

The dq/three-phase voltage conversion unit 15 performs three-phase conversion based on the rotational position θ obtained by the rotational position detector 8 on the d-axis voltage command Vd* and the q-axis voltage command Vq* calculated by the current control unit 14, and calculates three-phase voltage commands Vu*, Vv*, and Vw* (U-phase voltage command value Vu*, V-phase voltage command value Vv*, and W-phase voltage command value Vw*). As a result, the three-phase voltage commands Vu*, Vv*, and Vw* according to the torque command T* are generated.

The carrier wave frequency adjustment unit 16 calculates the carrier wave frequency fc representing the frequency of the carrier wave used to generate the gate signal based on the d-axis voltage command Vd* and the q-axis voltage command Vq* generated by the current command generation unit 11, the rotational position θ obtained by the rotational position detector 8, the rotational speed ωr obtained by the speed calculation unit 12, the d-axis current value Id, and the magnet temperature Tmag. By the triangular wave generation unit 17 generating the carrier wave according to the carrier wave frequency fc, the frequency of the carrier wave is adjusted so that the magnet eddy current loss and an AC copper loss generated in the motor 2 can be suppressed. Note that details of a method of calculating the carrier wave frequency fc by the carrier wave frequency adjustment unit 16 will be described later.

The triangular wave generation unit 17 generates a triangular wave signal (carrier wave signal) Tr based on the carrier wave frequency fc calculated by the carrier wave frequency adjustment unit 16.

The gate signal generation unit 18 performs pulse width modulation on each of the three-phase voltage commands Vu*, Vv*, and Vw* output from the dq/three-phase voltage conversion unit 15 by using the triangular wave signal Tr output from the triangular wave generation unit 17, and generates a gate signal for controlling the operation of the inverter 3. Specifically, on the basis of a comparison result between the three-phase voltage commands Vu*, Vv*, and Vw* output from the dq/three-phase voltage conversion unit 15 and the triangular wave signal Tr output from the triangular wave generation unit 17, a pulsed voltage is generated for each of the U phase, the V phase, and the W phase. Then, a gate signal for the switching element of each phase of the inverter 3 is generated based on the generated pulsed voltage. At this time, the gate signals Gup, Gvp, and Gwp of the upper arms of the respective phases are logically inverted to generate the gate signals Gun, Gvn, and Gwn of the lower arms. The gate signal generated by the gate signal generation unit 18 is output from the motor control device 1 to the PWM signal drive circuit 32 of the inverter 3, and is converted into a PWM signal by the PWM signal drive circuit 32. As a result, each switching element of the inverter circuit 31 is controlled to be turned on/off, and the output voltage of the inverter 3 is adjusted.

Next, an operation of the carrier wave frequency adjustment unit 16 in the motor control device 1 will be described. As described above, the carrier wave frequency adjustment unit 16 calculates the carrier wave frequency fc based on the d-axis voltage command Vd*, the q-axis voltage command Vq*, the rotational position θ, the rotational speed ωr, the d-axis current value Id, and the magnet temperature Tmag. By sequentially controlling the frequency of the triangular wave signal Tr generated by the triangular wave generation unit 17 according to the carrier wave frequency fc, the voltage waveforms of the three-phase voltage commands Vu*, Vv*, and Vw* according to the torque command T* are adjusted such that the cycle and the phase of the triangular wave signal Tr, which is a carrier wave, have a desired relationship. Here, the desired relationship refers to, for example, a relationship in which an eddy current loss generated in a magnet attached to the rotor of the motor 2 is minimized.

Figure 3:
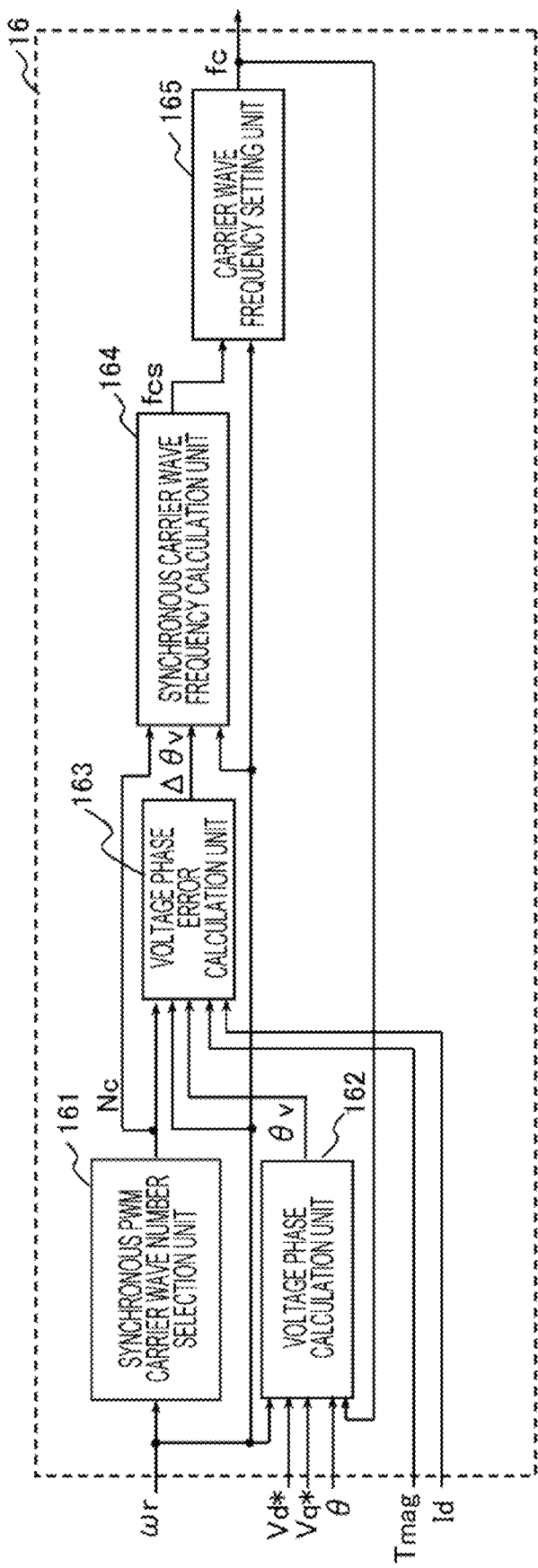
FIG. 3 is a block diagram of a carrier wave frequency adjustment unit according to the first embodiment of the present invention.

FIG. 3 is a block diagram of the carrier wave frequency adjustment unit 16 according to the first embodiment of the present invention. The carrier wave frequency adjustment unit 16 includes a synchronous PWM carrier wave number selection unit 161, a voltage phase calculation unit 162, a voltage phase error calculation unit 163, a synchronous carrier wave frequency calculation unit 164, and a carrier wave frequency setting unit 165.

The synchronous PWM carrier wave number selection unit 161 selects the number of synchronous PWM carrier waves Nc representing the number of carrier waves for one cycle of the voltage waveform in the synchronous PWM control based on the rotational speed ωr. For example, the synchronous PWM carrier wave number selection unit 161 selects the number satisfying the conditional expression of Nc=3×(2×n−1) among multiples of 3 as the number of synchronous PWM carrier waves Nc. In this conditional expression, n represents an arbitrary natural number, and for example, n=1 (Nc=3), n=2 (Nc=9), n=3 (Nc=15), or the like is often selected. In addition, by using a special carrier wave, it is also possible to select, as the number of synchronous PWM carrier waves Nc, a number that does not satisfy the above conditional expression even when the number is a multiple of 3, for example, Nc=6 or Nc=12. The synchronous PWM carrier wave number selection unit 161 may select the number of synchronous PWM carrier waves Nc based on not only the rotational speed ωr but also the torque command T*. Further, a selection criterion of the number of synchronous PWM carrier waves Nc may be changed between when the rotational speed ωr increases and when it decreases, for example, by setting hysteresis.

The voltage phase calculation unit 162 calculates the voltage phase θv by the following Equations (4) to (7) on the basis of the d-axis voltage command Vd*, the q-axis voltage command Vq*, the rotational position θ, the rotational speed ωr, and the carrier wave frequency fc.

$$\theta v = \theta + \varphi v + \varphi dqv + 0.5\pi \quad (4)$$

$$\varphi v = \omega r \cdot 1.5 Tc \quad (5)$$

$$Tc = 1/fc \quad (6)$$

$$\varphi dqv = a \tan(Vq/Vd) \quad (7)$$

Here, φv represents a calculation delay compensation value of a voltage phase, Tc represents a carrier wave period, and φdqv represents the voltage phase from the d-axis. The calculation delay compensation value v is a value that compensates for occurrence of a calculation delay corresponding to 1.5 control cycles during a period from when the rotational position detector 8 acquires the rotational position θ to when the motor control device 1 outputs the gate signal to the inverter 3. In the present embodiment, 0.5π is added in the fourth term on the right side of Equation (4). Since the voltage phase calculated in the first to third terms on the right side of Equation (4) is a cos wave, this is a calculation for performing viewpoint transformation of this into a sin wave.

The voltage phase error calculation unit 163 calculates a voltage phase error Δθv based on the number of synchronous PWM carrier waves Nc selected by the synchronous PWM carrier wave number selection unit 161, the voltage phase θv calculated by the voltage phase calculation unit 162, the rotational speed ωr, the magnet temperature Tmag, and the d-axis current Id. The voltage phase error Δθv represents a phase difference between the three-phase voltage commands Vu*, Vv*, and Vw*, which are voltage commands for the inverter 3, and the triangular wave signal Tr, which is a carrier wave used for pulse width modulation. The voltage phase error calculation unit 163 calculates the voltage phase error Δθv every predetermined calculation period, so that the carrier wave frequency adjustment unit 16 can adjust the frequency of the triangular wave signal Tr so as to change the phase difference between the voltage command to the inverter 3 and the carrier wave used for pulse width modulation. As described above, the reference voltage phase θvb is a reference value of the phase of the carrier wave in the synchronous PWM control.

The synchronous carrier wave frequency calculation unit 164 calculates a synchronous carrier wave frequency fcs based on the voltage phase error Δθv calculated by the voltage phase error calculation unit 163, the rotational speed ωr, and the number of synchronous PWM carrier waves Nc selected by the synchronous PWM carrier wave number selection unit 161 according to the following Equation (8).

$$fcs = \omega r \cdot Nc \cdot (1 + \Delta\theta v \cdot K)/(2\pi) \quad (8)$$

The synchronous carrier wave frequency calculation unit 164 can calculate the synchronous carrier wave frequency fcs based on Equation (8), for example, by phase locked loop (PLL) control. In Equation (8), the gain K may be a constant value or may be variable depending on conditions.

The carrier wave frequency setting unit 165 selects either the synchronous carrier wave frequency fcs calculated by the synchronous carrier wave frequency calculation unit 164 or an asynchronous carrier wave frequency fcns on the basis of the rotational speed ωr, and outputs the selected frequency as the carrier wave frequency fc. The asynchronous carrier wave frequency fcns is a constant value set in advance in the carrier wave frequency setting unit 165. Note that a plurality of asynchronous carrier wave frequencies fcns may be prepared in advance, and one of them may be selected according to the rotational speed ωr. For example, the carrier wave frequency setting unit 165 can select and output the asynchronous carrier wave frequency fcns as the carrier wave frequency fc such that the larger the value of the rotational speed ωr, the larger the value of the asynchronous carrier wave frequency fcns.

Next, a method of calculating the voltage phase error Δθv in the voltage phase error calculation unit 163 in the carrier wave frequency adjustment unit 16 will be described in detail.

Figure 4:
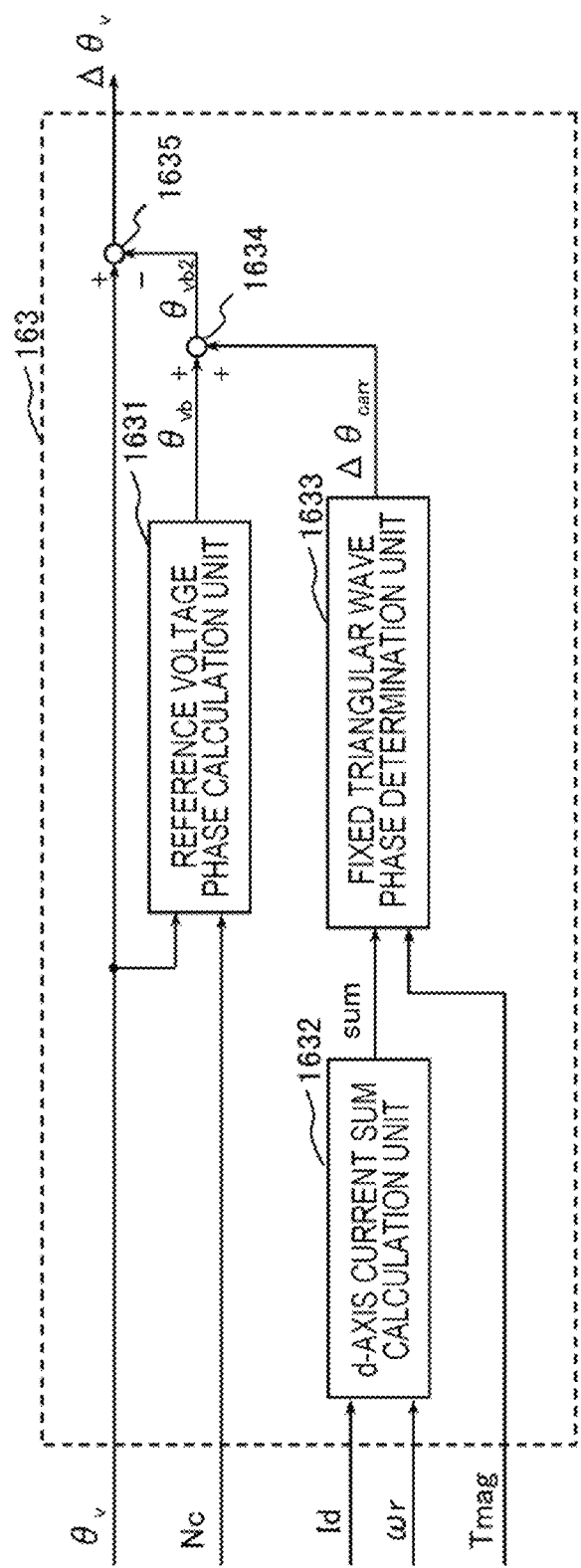
FIG. 4 is a block diagram of a voltage phase error calculation unit according to the first embodiment of the present invention.

FIG. 4 is a block diagram of the voltage phase error calculation unit 163 according to the first embodiment of the present invention. The voltage phase error calculation unit 163 includes a reference voltage phase calculation unit 1631, a d-axis current sum calculation unit 1632, a fixed triangular wave phase determination unit 1633, an addition unit 1634, and a subtraction unit 1635.

The reference voltage phase calculation unit 1631 calculates the reference voltage phase θvb for fixing the phase of the carrier wave in the synchronous PWM control based on the number of synchronous PWM carrier waves Nc and the voltage phase θv.

Figure 5:
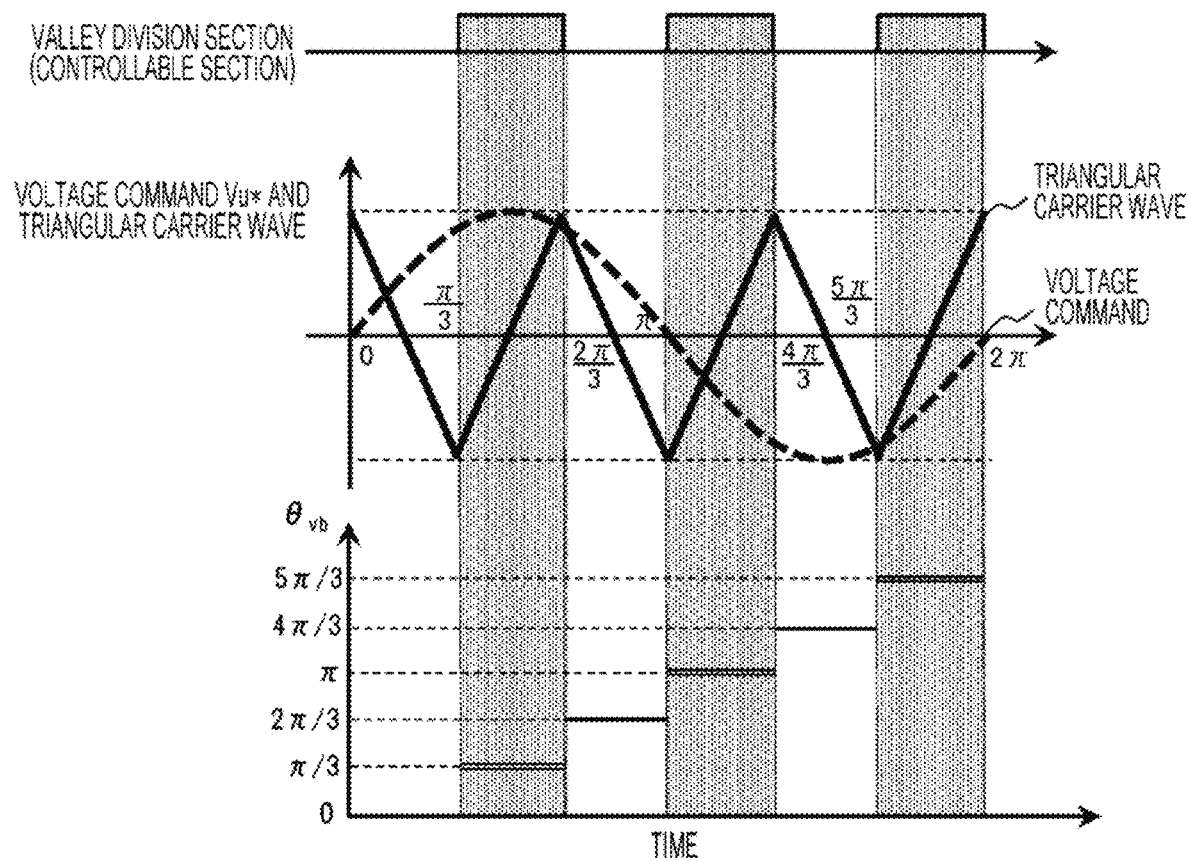
FIG. 5 is a conceptual diagram of reference voltage phase calculation of the present invention.

FIG. 5 is a conceptual diagram of the reference voltage phase calculation performed by the reference voltage phase calculation unit 1631. For example, as illustrated in FIG. 5, the reference voltage phase calculation unit 1631 calculates the reference voltage phase θvb that changes stepwise between 0 and 2π with the number of steps corresponding to the number of synchronous PWM carrier waves Nc. Although FIG. 5 illustrates an example when the number of synchronous PWM carrier waves Nc is 3 for easy understanding of the description, actually, the number of synchronous PWM carrier waves Nc is preferably Nc=3, 9, or 15 as described above. Alternatively, Nc may be 6 or 12.

In the present embodiment, in order to reduce a processing load, for example, as illustrated in FIG. 5, the carrier wave frequency adjustment unit 16 can adjust the frequency of the carrier wave only in a valley division section that is a section in which the triangular carrier wave rises from the minimum value (valley) to the maximum value (peak). In this case, as described later, the synchronous carrier wave frequency calculation unit 164 performs the synchronous PWM control by sequentially calculating the synchronous carrier wave frequency fcs from the voltage phase error Δθv in the valley division section of the carrier wave. The reference voltage phase calculation unit 1631 calculates the reference voltage phase θvb used for the calculation of the voltage phase error Δθv as a discrete value that changes at π/3 intervals as illustrated in FIG. 5. The interval between the reference voltage phases θvb changes according to the number of synchronous PWM carrier waves Nc. As the number of synchronous PWM carrier waves Nc increases, the interval between the reference voltage phases θvb decreases.

Specifically, the reference voltage phase calculation unit 1631 calculates the reference voltage phase θvb based on the voltage phase θv and the number of synchronous PWM carrier waves Nc according to the following Equations (9) to (10).

$$\theta vb = \text{int}(\theta v/\theta s) \cdot \theta s + 0.5\theta s \quad (9)$$

$$\theta s = 2\pi/Nc \quad (10)$$

Here, θs represents a change width of the voltage phase θv per carrier wave, and int represents a rounding down operation after the decimal point.

Note that, in the present embodiment, the reference voltage phase calculation unit 1631 calculates the reference voltage phase θvb according to Equations (9) to (10) so that the reference voltage phase θvb becomes 0 rad in a peak division section, which is a section in which the triangular carrier wave falls from the maximum value (peak) to the minimum value (valley). However, the period during which the reference voltage phase θvb becomes 0 rad is not limited to the peak division section. As long as the reference voltage phase θvb changing stepwise with the number of steps corresponding to the number of synchronous PWM carrier waves Nc between 0 and 2π can be calculated using the voltage phase θv, the reference voltage phase calculation unit 1631 may calculate the reference voltage phase θvb by a calculation method other than Equations (9) to (10).

The d-axis current sum calculation unit 1632 calculates a d-axis current sum for suppressing the eddy current loss of the magnet generated in the motor 2 based on the d-axis current value Id obtained by the three-phase/dq conversion unit 13 and the motor rotational speed ωr. The d-axis current sum will be described later in detail.

The fixed triangular wave phase determination unit 1633 determines the carrier wave phase difference Δθcarr used for the calculation of the voltage phase error Δθv based on the d-axis current sum calculated by the d-axis current sum calculation unit 1632 and the magnet temperature Tmag. Here, the carrier wave generation method is selected according to the value of the magnet temperature Tmag, and the carrier wave phase difference Δθcarr is determined according to the selection result. Note that details of fixed triangular wave phase determination unit 1633 will be described later.

The addition unit 1634 adds the carrier wave phase difference Δθcarr determined by the fixed triangular wave phase determination unit 1633 to the reference voltage phase θvb calculated by the reference voltage phase calculation unit 1631 to calculate a corrected reference voltage phase θvb2.

The subtraction unit 1635 subtracts the corrected reference voltage phase θvb2 from the voltage phase θv to calculate the voltage phase error Δθv.

Next, details of the d-axis current sum calculation unit 1632 and the fixed triangular wave phase determination unit 1633, which are features of the present embodiment, will be described below.

Figure 6:
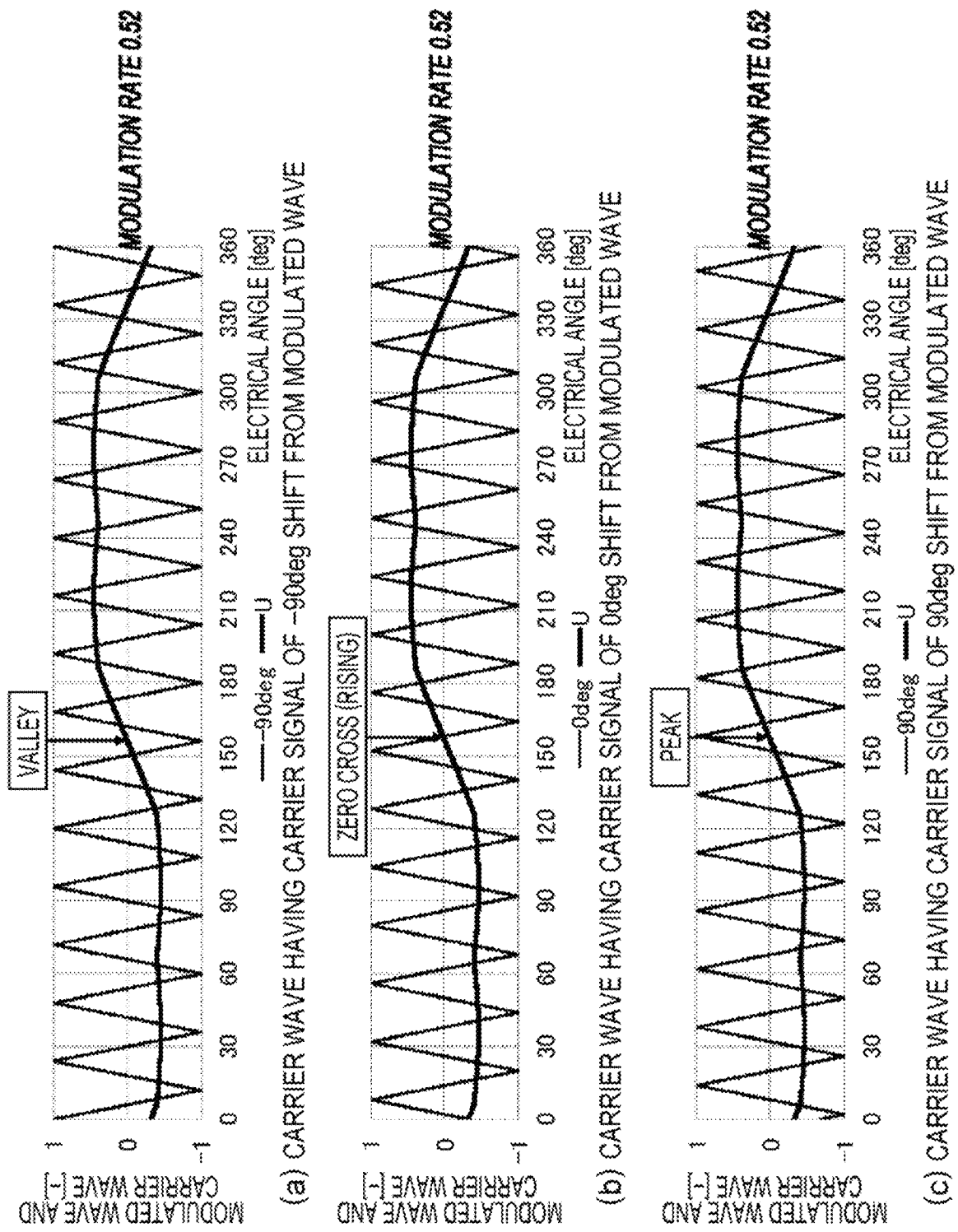
FIGS. 6A to 6C is a diagram illustrating a relationship between voltage waveforms in a case where a phase difference between a modulated wave and a carrier wave is changed.

First, a basic idea of a method for determining the carrier wave phase difference Δθcarr of the present embodiment will be described below with reference to FIGS. 6A-C and 7A-B. FIGS. 6A-C is a diagram illustrating a relationship between voltage waveforms when a phase difference (hereinafter, referred to as a "modulated wave/carrier wave phase difference") between a U-phase voltage command Vu* as a modulated wave and a triangular wave signal Tr as a carrier wave is changed. FIG. 6A illustrates the voltage waveforms of the carrier wave and the modulated wave when the modulated wave/carrier wave phase difference is −90 deg, FIG. 6B illustrates the voltage waveforms of the carrier wave and the modulated wave when the modulated wave/carrier wave phase difference is 0 deg, and FIG. 6C illustrates the voltage waveforms of the carrier wave and the modulated wave when the modulated wave/carrier wave phase difference is 90 deg. In the case of FIG. 6A, the triangular wave which is the carrier wave becomes a valley at the time of zero cross rising of the modulated wave, in the case of FIG. 6B, the triangular wave becomes a zero cross falling at the time of zero cross rising of the modulated wave, and in the case of FIG. 6C, the triangular wave becomes a peak at the time of zero cross rising of the modulated wave. As described above, by changing the modulated wave/carrier wave phase difference, it is possible to freely change the phase of the harmonic component other than the fundamental wave component while keeping the amplitude of the U-phase AC voltage Vu obtained by the PWM control constant as described below.

In FIGS. 6A to 6C, for convenience of description, a frequency ratio between the modulated wave and the carrier wave is set to 15, but the present invention is not limited thereto. FIGS. 6A to 6C illustrate the U-phase voltage command Vu* as an example of the modulated wave, but it is also possible to freely change the phase of the harmonic component other than the fundamental wave component by setting the modulated wave/carrier wave phase difference similarly to FIGS. 6A to 6C for the voltage command of the other phase, that is, the V-phase voltage command Vv* and the W-phase voltage command Vw*.

Figure 7:
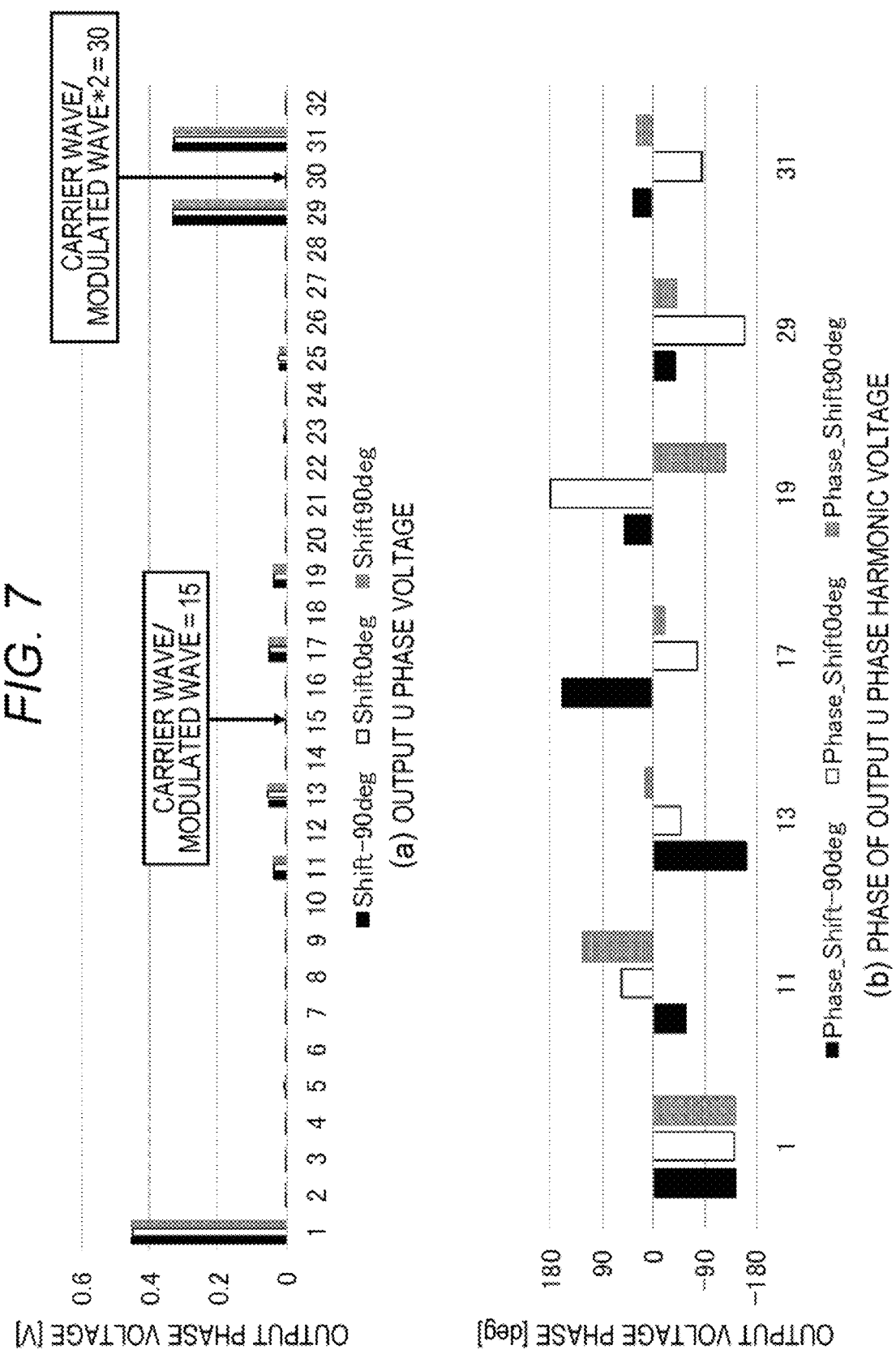
FIGS. 7A to 7B is a diagram illustrating harmonic components of a U-phase AC voltage when the phase difference between the modulated wave and the carrier wave is changed.

FIGS. 7A to 7B is a diagram illustrating harmonic components of the U-phase AC voltage Vu output from the inverter 3 to the motor 2 when the phase difference between the U-phase voltage command Vu* as a modulated wave and the triangular wave signal Tr as a carrier wave is changed. FIG. 7A illustrates the modulated wave/carrier wave phase difference illustrated in FIGS. 6A to 6C, that is, the amplitude of each harmonic component of the U-phase AC voltage Vu at each phase difference of −90 deg, 0 deg, and 90 deg, and FIG. 7B) illustrates the phase of each harmonic component of the U-phase AC voltage Vu at each phase difference. FIGS. 7A and 7B illustrate an amplitude and a phase of a fundamental wave component as a primary component of the U-phase AC voltage Vu. FIG. 7B) illustrates phases of 11th, 13th, 17th, 19th, 29th, and 31st harmonic components having relatively large amplitudes in FIG. 7A when the phase of the fundamental wave component is −135 deg.

From FIG. 7A, it is confirmed that the amplitude of each order component including the first order (fundamental wave) does not change in the U-phase AC voltage Vu output from the inverter 3 even when the modulated wave/carrier wave phase difference is changed. That is, it can be seen that the torque output value of the motor 2 does not change even when the modulated wave/carrier wave phase difference is changed. Meanwhile, from FIG. 7B, it can be seen that the phase of each harmonic component other than the first order (fundamental wave) component of the U-phase AC voltage Vu changes according to the modulated wave/carrier wave phase difference. That is, changing the modulated wave/carrier wave phase difference can be said to be equivalent to changing the phase of the harmonic component other than the fundamental wave component of the U-phase AC voltage Vu.

FIGS. 7A and 7B illustrate the frequency analysis results of the U-phase AC voltage Vu among the three-phase AC voltages output from the inverter 3, but the same frequency analysis results as those in FIGS. 7A and 7B are obtained for the AC voltages of the other phases, that is, the V-phase AC voltage Vv and the W-phase AC voltage Vw. Therefore, by changing the modulated wave/carrier wave phase difference, it is possible to arbitrarily change the phase of harmonic components other than the fundamental wave component of the three-phase AC voltage output from the inverter 3.

As described above, when the modulated wave/carrier wave phase difference changes, the phase of the harmonic component other than the fundamental wave component of the three-phase AC voltage output from the inverter 3 changes. As a result, the d-axis voltage Vd and the q-axis voltage Vq obtained by dq-axis conversion of the three-phase AC voltage change, and the d-axis current Id and the q-axis current Iq also change accordingly. Here, the eddy current loss of the magnet installed in the rotor of the motor 2 is Joule heat generated when an induced electromotive force is generated inside the magnet due to fluctuation of a magnetizing force generated by application of a three-phase AC voltage from the inverter 3 to each coil of the motor 2, and an eddy current flows through the magnet. The eddy current loss We is expressed by a proportional relationship illustrated in the following Equation (11).

$$We \propto B^2 * f^2 \tag{11}$$

Here, B is a maximum magnetic flux density of the coil, and f is the frequency of the current flowing through the coil.

From Equation (11), it can be seen that the eddy current loss We is dominated by the square of the change amount of the magnetic flux density of the coil and the square of the frequency of the coil current. The change amount of the magnetic flux density is proportional to the change amount of the d-axis current Id when viewed from the magnet, and the frequency of the coil current is proportional to the frequency of the three-phase AC voltage output from the inverter 3 to the motor 2. In addition, when the d-axis current Id is subjected to frequency analysis, the d-axis current Id includes harmonic components of each order with respect to the frequency of the fundamental wave determined according to the frequency of the three-phase AC voltage. Therefore, Equation (11) can be expressed by being replaced with the proportional relationship illustrated in the following Equation (12).

$$We \propto \Sigma(Id\_n^2 * n^2) \tag{12}$$

Here, n represents the order of the harmonic component of the d-axis current Id, and Id_n represents the magnitude of the nth harmonic component of the d-axis current Id. However, the order n is not limited to an integer, and any positive number can be included. Hereinafter, the value represented by the right side of Equation (12), that is, the sum of the product of the square of the d-axis harmonic current Id_n and the square of the order n is referred to as the "d-axis current sum". Note that, in a case where n=1 in Id_n, Id_n represents a fundamental wave component of the d-axis current Id, and the frequency thereof coincides with the frequency of the three-phase AC voltage.

Figure 8:
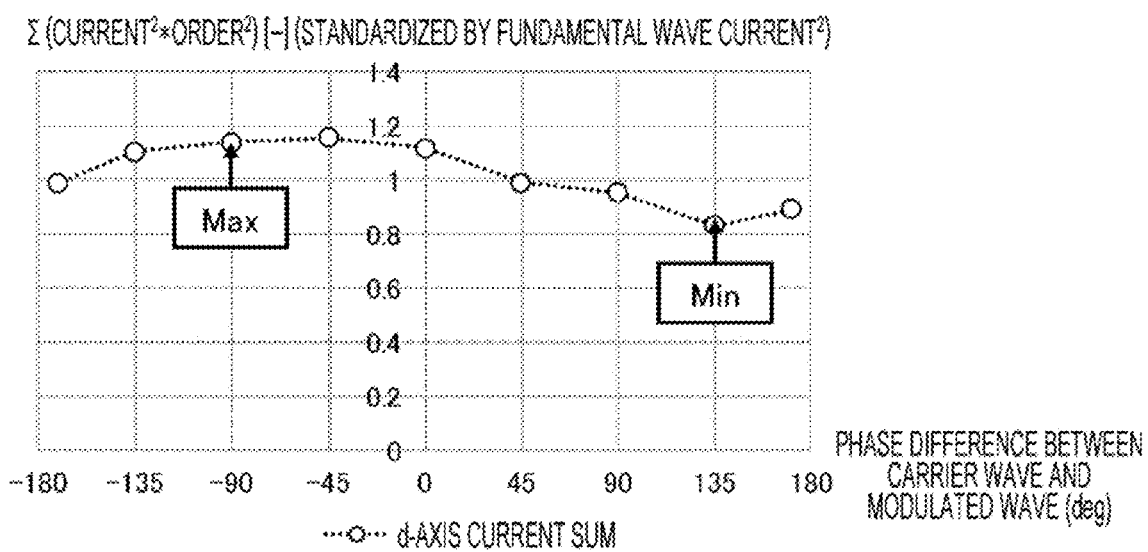
FIG. 8 is a diagram illustrating a relationship between the modulated wave/carrier wave phase difference and a d-axis current sum.

FIG. 8 is a diagram illustrating the relationship between the modulated wave/carrier wave phase difference and the d-axis current sum when the modulation rate is 1.15 and the frequency ratio between the carrier wave and the modulated wave is 9. In FIG. 8, when the modulated wave/carrier wave phase difference is 135 deg, the value of the d-axis current sum is minimum. Therefore, from the proportional relationship of Equation (12), it is predicted that the magnet temperature Tmag is minimized when the modulated wave/carrier wave phase difference is set to 135 deg.

Actually, in a case where the temperature rise of the magnet temperature Tmag from the reference temperature when the motor 2 is driven in the vicinity of the modulation rate of 1.15 was measured, the temperature rise was 63.5° C. when the modulated wave/carrier wave phase difference was 135 deg. Meanwhile, in the case where the modulated wave/carrier wave phase difference was 90 deg, it was confirmed that the temperature rise was 67° C., which was 3.5° C. higher than that in the case of 135 deg.

As described above, by changing the modulated wave/carrier wave phase difference, the phase of each harmonic component of the three-phase AC voltage output from the inverter 3 can be changed while maintaining the torque output value of the motor 2, and the value of the d-axis current sum can be changed accordingly. Therefore, it is possible to adjust the eddy current loss We based on the proportional relationship of Equation (12). As a result, it can be seen that the eddy current loss of the magnet installed in the rotor of the motor 2 can be reduced without deteriorating the output torque and efficiency of the motor 2.

In the present embodiment, based on the above idea, the d-axis current sum calculation unit 1632 and the fixed triangular wave phase determination unit 1633 determine the value of the carrier wave phase difference Δθcarr so that the voltage phase error Δθv that realizes the modulated wave/carrier wave phase difference capable of suppressing the eddy current loss of the magnet of the motor 2 can be set. A specific method thereof will be described below with reference to FIG. 9.

Figure 9:
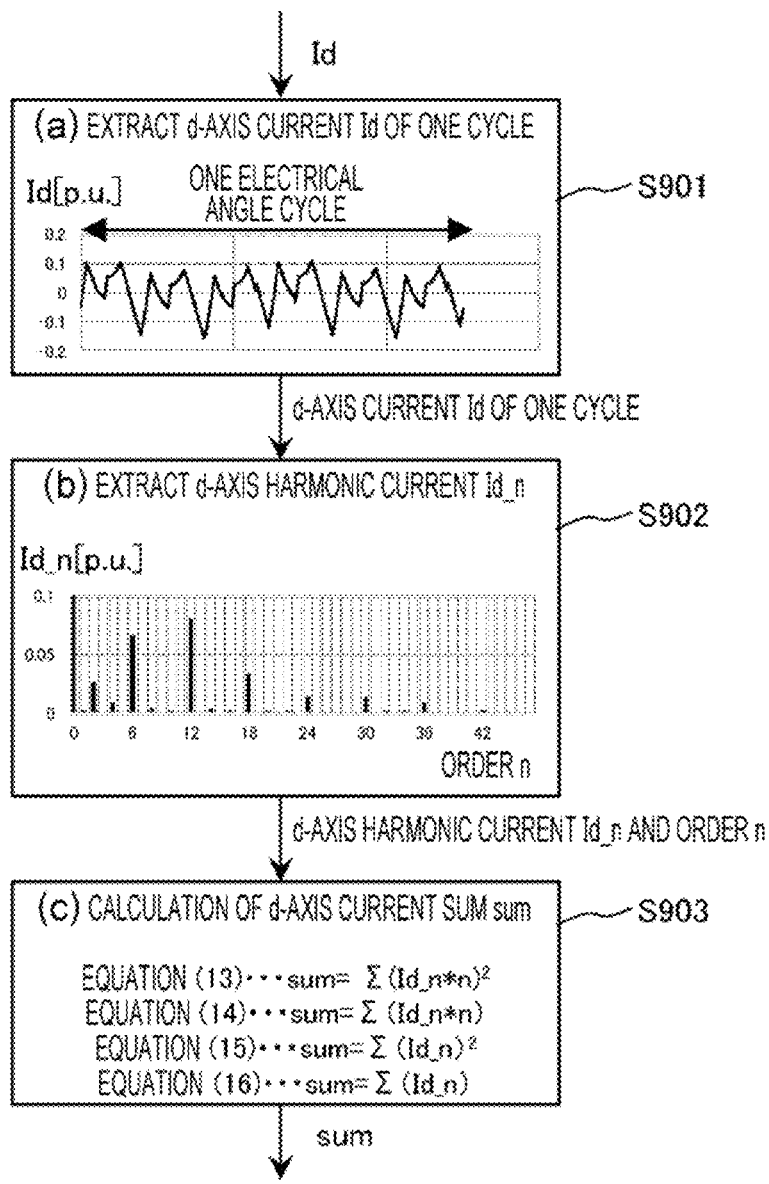
FIG. 9 is a flowchart illustrating a calculation procedure of the d-axis current sum.

FIG. 9 is a flowchart illustrating a procedure for calculating the d-axis current sum sum by the d-axis current sum calculation unit 1632. The d-axis current sum calculation unit 1632 calculates the d-axis current sum according to the flowchart of FIG. 9 based on the d-axis current value Id and the motor rotational speed ωr.

First, in Step S901, the d-axis current sum calculation unit 1632 extracts one electrical angle cycle from the input d-axis current Id on the basis of the motor rotational speed ωr. Subsequently, in Step S902, the d-axis current Id of one electrical angle cycle extracted in Step S901 is subjected to frequency analysis, and the n-th d-axis harmonic current Id_n is extracted for each order. Finally, in Step S903, the d-axis current sum is calculated by the following Equation (13) based on the d-axis harmonic current Id_n and the order n for each order extracted in Step S902.

$$\text{sum} = \Sigma(Id\_n^2 * n^2) \quad (13)$$

Instead of Equation (13), the d-axis current sum may be simply calculated using any one of the following Equations (14), (15), and (16). By using these calculation methods, it is possible to easily calculate the d-axis current sum sum serving as a guide to some extent with respect to the change in the eddy current loss We according to the modulated wave/carrier wave phase difference. Alternatively, the d-axis current sum may be calculated using the motor rotational speed ωr, the motor rotational frequency or the motor electrical angular frequency obtained based on the motor rotational speed ωr, or the like instead of the order n. In addition to this, a numerical value calculated by an arbitrary method can be used as the d-axis current sum sum as long as a change in the eddy current loss We is reflected.

$$\text{sum} = \Sigma(Id\_n * n) \quad (14)$$

$$\text{sum} = \Sigma(Id\_n^2) \quad (15)$$

$$\text{sum} = \Sigma(Id\_n) \quad (16)$$

The fixed triangular wave phase determination unit 1633 determines the value of the carrier wave phase difference Δθcarr on the basis of the d-axis current sum sum calculated by the d-axis current sum calculation unit 1632. Here, the value of the carrier wave phase difference Δθcarr is determined so that the value of the d-axis current sum sum is minimized. For example, the value of the d-axis current sum is acquired by changing the value of the carrier wave phase difference Δθcarr within a predetermined range, and the value of the carrier wave phase difference Δθcarr when the minimum d-axis current sum is obtained is determined as the final value of the carrier wave phase difference Δθcarr.

Alternatively, as illustrated in FIG. 8 described above, the relationship between the modulated wave/carrier wave phase difference and the d-axis current sum sum may be stored in advance in a predetermined storage area included in the fixed triangular wave phase determination unit 1633, and the value of the carrier wave phase difference Δθcarr at which the value of the d-axis current sum is minimized may be determined on the basis of this relationship. In this case, using the motor rotational speed ωr, the torque command T*, and the like as parameters, an optimum value of the carrier wave phase difference Δθcarr may be acquired in advance by analysis or the like for each value of these parameters, and stored in the fixed triangular wave phase determination unit 1633 as map information. In this way, since the value of the carrier wave phase difference Δθcarr can be changed according to the operation state of the motor 2, the optimum value of the carrier wave phase difference Δθcarr can be obtained in the fixed triangular wave phase determination unit 1633. In this case, the d-axis current sum calculation unit 1632 may not be provided in the voltage phase error calculation unit 163, and the calculation of the d-axis current sum may be omitted.

Furthermore, the fixed triangular wave phase determination unit 1633 may change the method of determining the carrier wave phase difference Δθcarr on the basis of the magnet temperature Tmag. For example, when the magnet temperature Tmag is equal to or lower than a predetermined temperature, the carrier wave phase difference Δθcarr is set to a predetermined value, and the modulated wave/carrier wave phase difference for reducing the eddy current loss of the magnet is not adjusted. Meanwhile, when the magnet temperature Tmag exceeds the predetermined temperature, the fixed triangular wave phase determination unit 1633 determines the carrier wave phase difference Δθcarr so that the value of the d-axis current sum becomes minimum. In this way, it is possible to appropriately determine whether suppression of the eddy current loss of the magnet is necessary according to the magnet temperature Tmag and to effectively switch the value of the carrier wave phase difference Δθcarr according to the determination result. In this case, when the magnet temperature Tmag changes across the predetermined temperature, it is preferable to change the carrier wave phase difference Δθcarr in a ramp shape in order to avoid occurrence of excessive fluctuation in the three-phase AC voltage output from the inverter 3 due to a rapid change in the carrier wave phase difference Δθcarr before and after the change.

Note that, in a case where the method for determining the carrier wave phase difference Δθcarr is changed on the basis of the magnet temperature Tmag as described above, when the magnet temperature Tmag is equal to or lower than the predetermined temperature, the fixed triangular wave phase determination unit 1633 may determine the carrier wave phase difference Δθcarr by another method. For example, by using the method described in JP 2019-1657712 (filed on Sep. 11, 2019), the carrier wave phase difference Δθcarr can be determined so as to reduce the torque pulsation and the annular vibration caused by the electromagnetic design of the motor 2. In addition, the carrier wave phase difference Δθcarr may be determined so as to achieve both suppression of the magnet temperature Tmag and reduction of vibration and noise of the motor 2. In addition to this, the carrier wave phase difference Δθcarr can be determined by an arbitrary method.

In the voltage phase error calculation unit 163, the carrier wave phase difference Δθcarr is determined and the voltage phase error Δθv is calculated as described above. Thus, the voltage phase error Δθv can be determined such that the d-axis current sum sum is minimized according to the d-axis current. Id and the motor rotational speed ωr. As a result, the carrier wave frequency fc can be set by changing the phase difference between the voltage command to the inverter 3 and the carrier wave used for pulse width modulation so as to reduce the eddy current loss generated in the magnet of the rotor of the motor 2. As a result, an increase in the magnet temperature Tmag can be suppressed, and occurrence of irreversible demagnetization can be prevented.

According to the first embodiment of the present invention described above, the following operational effects are achieved.

(1) The motor control device 1 is connected to an inverter 3 that performs power conversion from DC power to AC power, and controls driving of the motor 2 driven using the AC power. The motor control device 1 includes the triangular wave generation unit 17 that generates the triangular wave signal Tr that is the carrier wave, the carrier wave frequency adjustment unit 16 that adjusts the carrier wave frequency fc representing the frequency of the triangular wave signal Tr, and the gate signal generation unit 18 that performs pulse width modulation of the three-phase voltage commands Vu*, Vv*, and Vw* according to the torque command T* by using the triangular wave signal Tr and generates the gate signal for controlling the operation of the inverter 3. The carrier wave frequency adjustment unit 16 adjusts the phase difference between the three-phase voltage commands Vu*, Vv*, and Vw* and the triangular wave signal Tr so as to reduce the eddy current loss We generated in the magnet of the rotor of the motor 2 according to the d-axis current Id energized to the motor 2 and the motor rotational speed ωr representing the rotational speed of the motor 2. With this configuration, it is possible to prevent the occurrence of the irreversible demagnetization of the motor 2 while suppressing the switching loss of the inverter 3.

(2) The voltage phase error calculation unit 163 of the carrier wave frequency adjustment unit 16 uses the d-axis current sum calculation unit 1632 and the fixed triangular wave phase determination unit 1633 to determine the carrier wave phase difference Δθcarr for reducing the eddy current loss We on the basis of the d-axis current Id and the motor rotational speed ωr. Then, using the determined carrier wave phase difference Δθcarr, the reference voltage phase calculation unit 1631, the addition unit 1634, and the subtraction unit 1635 calculate the voltage phase error Δθv to adjust the phase of the triangular wave signal Tr. As a result, the phase difference between the three-phase voltage commands Vu*, Vv*, and Vw* and the triangular wave signal Tr is adjusted. With this configuration, it is possible to reliably adjust the phase difference between the three-phase voltage commands Vu*, Vv*, and Vw* and the triangular wave signal Tr so as to reduce the eddy current loss We generated in the magnet of the rotor of the motor 2.

(3) The voltage phase error calculation unit 163 of the carrier wave frequency adjustment unit 16 causes the d-axis current sum calculation unit 1632 to extract the d-axis current Id corresponding to one electrical angle cycle based on the motor rotational speed ωr (Step S901), and calculates the d-axis current sum using any one of Equations (13) to (16) with respect to extracted d-axis current Id corresponding to one electrical angle cycle. That is, one of the total value of the product of the square of each harmonic Id_n of the d-axis current represented by Equation (13) and the square of its order n, the total value of the product of each harmonic Id_n of the d-axis current represented by Equation (14) and its order n, the total value of the square of each harmonic Id_n of the d-axis current represented by Equation (15), or the total value of each harmonic Id_n of the d-axis current represented by Equation (16) is calculated as the d-axis current sum sum (Step S903). Then, the fixed triangular wave phase determination unit 1633 determines the carrier wave phase difference Δθcarr on the basis of the total value. With this configuration, the carrier wave phase difference Δθcarr for reducing the eddy current loss We generated in the magnet of the rotor of the motor 2 can be reliably determined.

(4) In the carrier wave frequency adjustment unit 16, the fixed triangular wave phase determination unit 1633 has a storage area in which a carrier wave phase difference Δθcarr for reducing the eddy current loss We is stored in advance, and can adjust the phase difference between the three-phase voltage commands Vu*, Vv*, and Vw* and the triangular wave signal Tr by adjusting the phase of the triangular wave signal Tr using the carrier wave phase difference Δθcarr stored in the storage area. In this way, the carrier wave phase difference Δθcarr for reducing the eddy current loss We can be easily and reliably determined, and the three-phase voltage commands Vu*, Vv*, and Vw* and the triangular wave signal Tr can be adjusted.

(5) The motor control device 1 acquires the magnet temperature Tmag by acquiring the detection result of the magnet temperature Tmag from the temperature sensor 52 that detects the magnet temperature Tmag or estimating the magnet temperature Tmag based on the temperature dependency of the induced voltage of the motor 2. The carrier wave frequency adjustment unit 16 may adjust the phase difference between the three-phase voltage commands Vu*, Vv*, and, Vw* and the triangular wave signal Tr when the magnet temperature Tmag exceeds a predetermined temperature. In this way, the magnet temperature Tmag can be reliably acquired regardless of the presence or absence of the temperature sensor 52. In addition, it is possible to appropriately determine whether suppression of the eddy current loss of the magnet is necessary according to the magnet temperature Tmag, and adjust the phase difference between the three-phase voltage commands Vu*, Vv*, and Vw* and the triangular wave signal Tr at appropriate timing according to the determination result.

(6) In the motor control device 1, when the magnet temperature Tmag is lower than the predetermined temperature in the carrier wave frequency adjustment unit 16, the phase difference between the three-phase voltage commands Vu*, Vv*, and Vw* and the triangular wave signal Tr may be set to a predetermined value by determining the carrier wave phase difference Δθcarr by an arbitrary method. In this way, when suppression of the eddy current loss of the magnet is not necessary, unnecessary processing can be reduced, and the processing load can be reduced.

Second Embodiment

Next, a second embodiment of the present invention will be described with reference to the drawings. In the present embodiment, an example in which a motor 2 is an interior permanent magnet synchronous motor (IPMSM) will be described. Configurations of a motor control device and a motor drive system in the present embodiment are the same as those in the first embodiment. Therefore, the present embodiment will be described below using the configurations of the motor control device 1 and the motor drive system 100 described in the first embodiment.

Many interior permanent magnet synchronous motors are used in electric vehicles such as hybrid vehicles and electric vehicles, and electric railroads. A major structural feature thereof is that a magnet attached to a rotor is embedded in a rotor core. As a result, there is an opposite saliency in which the inductance is different between a d-axis with a magnet and a q-axis without the magnet, and a q-axis inductance Lq is larger than a d-axis inductance Ld.

In the present embodiment, in a motor drive system 100 in which the interior permanent magnet synchronous motor is adopted for the motor 2, the motor control device 1 changes the phase difference between a voltage command for an inverter 3 and a carrier wave used for a pulse width modulation to set the carrier wave frequency fc so as to reduce an eddy current loss generated in the magnet of the rotor of the motor 2 as in the first embodiment. Therefore, in the motor control device 1 of the present embodiment, a voltage phase error calculation unit 163 of a carrier wave frequency adjustment unit 16 has the same configuration as that of FIG. 4 described in the first embodiment. Then, a d-axis current sum calculation unit 1632 and a fixed triangular wave phase determination unit 1633 calculate a d-axis current sum sum represented by any one of the above-described Equations (13) to (16), and determine the value of the carrier wave phase difference Δθcarr such that the value of the d-axis current sum sum is minimized.

In the case of the interior permanent magnet synchronous motor, in most cases, the q-axis inductance Lq is about 2 to 3 times larger than the d-axis inductance Ld. In such a case, the voltage equation of the transient state when dq-axis harmonic voltages Vd_n and Vq_n are applied to the motor 2 is given by the following Equations (17) and (18).

$$Vd\_n = Ld^*(dId\_n/dt) \quad (17)$$

$$Vq\_n = Lq^*(dIq\_n/dt) \quad (18)$$

Here, Id_n represents an n-th d-axis harmonic current, and Iq_n represents an n-th q-axis harmonic current.

As described above, in the motor 2 that is the interior permanent magnet synchronous motor, the q-axis inductance Lq is about 2 to 3 times larger than the d-axis inductance Ld. Therefore, when the d-axis harmonic voltage Vd_n and the q-axis harmonic voltage Vq_n are applied with the same magnitude, the d-axis harmonic current Id_n is about 2 to 3 times larger than the q-axis harmonic current Iq_n. Therefore, when a current ripple of the d-axis harmonic current Id_n is minimized, harmonic current ripples of the three-phase AC currents Iu, Iv, and Iw flowing through the motor 2 are also minimized, and as a result, an AC copper loss generated in many square lines and the like due to the harmonic current ripple of the three-phase AC current can be minimized.

Figure 10:
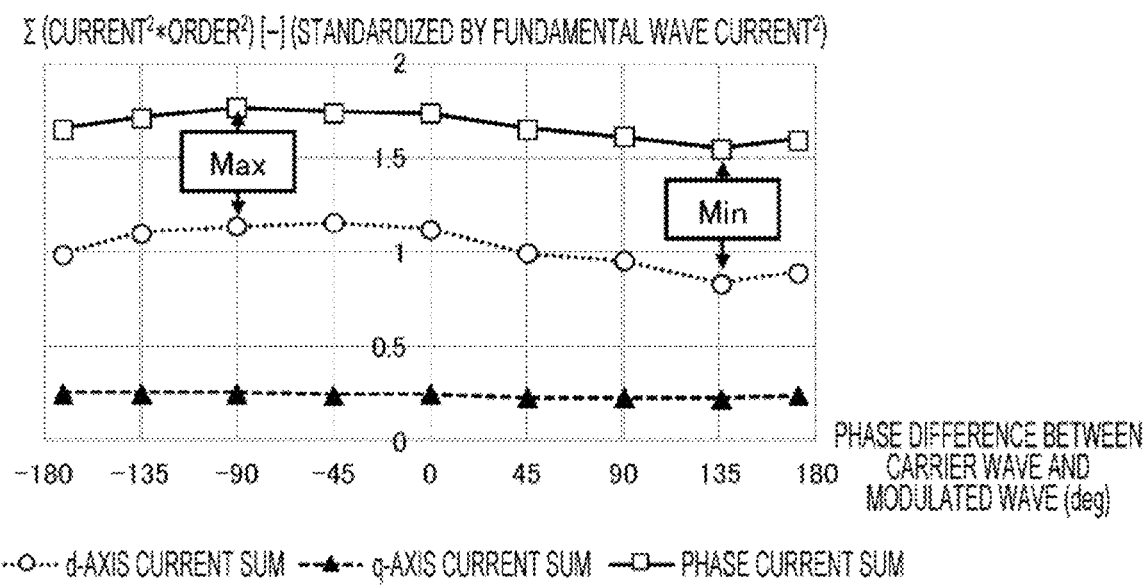
FIG. 10 is a diagram illustrating a relationship between the modulated wave/carrier wave phase difference and the d-axis current sum, a q-axis current sum, and a phase current sum.

FIG. 10 is a diagram illustrating the relationship between a modulated wave/carrier wave phase difference and a d-axis current sum, a q-axis current sum, and a phase current sum when a modulation rate is 1.15 and a frequency ratio between a carrier wave and a modulated wave is 9. In FIG. 10, the d-axis current sum is calculated by the above-described Equation (13). In addition, the q-axis current sum is calculated by Σ(Iq_n^2*n^2), and the phase current sum is calculated by Σ(I_n^2*n^2). Pere, Iq_n represents a harmonic component of each order of the q-axis current Iq, and I_n represents a harmonic component of each order of the U-phase current Iu (or V-phase current Iv or W-phase current Iw).

In FIG. 10, when the modulated wave/carrier wave phase difference is 135 deg, the value of the d-axis current sum is minimized, and at this time, the value of the phase current sum is also minimized. Therefore, when the modulated wave/carrier wave phase difference is set to 135 deg, it is predicted that the magnet temperature Tmag and the coil temperature are minimized.

Actually, when the magnet temperature Tmag and the coil temperature rise from the reference temperature when the motor 2 is driven in the vicinity of the modulation rate of 1.15 were measured, the magnet temperature Tmag and the coil temperature rise by 63.5° C. and 79.0° C., respectively, when the modulated wave/carrier wave phase difference was 135 deg. Meanwhile, when the modulated wave/carrier wave phase difference was 90 deg, the magnet temperature Tmag was increased by 67° C. and the coil temperature was increased by 80.4° C., and it was confirmed that the magnet temperature Tmag was higher by 3.5° C. and the coil temperature was higher by 1.4° C. than those in the case of 135 deg.

As described above, by changing the modulated wave/carrier wave phase difference, it is possible to adjust the eddy current loss We by changing the phase of each harmonic component of the three-phase AC voltage output from the inverter 3 while maintaining the torque output value of the motor 2, and changing the d-axis current sum and the phase current sum accordingly. As a result, it can be seen that the AC copper loss of the coil can be further reduced in addition to the eddy current loss of the magnet installed in the rotor of the motor 2 without deteriorating the output torque and efficiency of the motor 2, and the temperature rise of the motor 2 can be suppressed.

In the present embodiment, based on the above idea, the d-axis current sum calculation unit 1632 and the fixed triangular wave phase determination unit 1633 determine the value of the carrier wave phase difference Δθcarr so that the voltage phase error Δθv that realizes the modulated wave/carrier wave phase difference capable of suppressing the eddy current loss of the magnet of the motor 2 and the AC copper loss of the coil can be set. Note that the specific method is similar to that described in the first embodiment.

According to the second embodiment of the present invention described above, in a case where the interior permanent magnet synchronous motor is used, it is possible to achieve the same operational effects as those described in the first embodiment.

Third Embodiment

Next, a third embodiment of the present invention will be described with reference to the drawings. In the present embodiment, an example in which values of a d-axis current command Id* and a q-axis current command Iq* are changed according to a value of a magnet temperature Tmag will be described. Note that a configuration of a motor drive system in the present embodiment is the same as that of the first embodiment except for a motor control device 1. Therefore, the present embodiment will be described below using the configuration of the motor drive system 100 described in the first embodiment.

Figure 11:
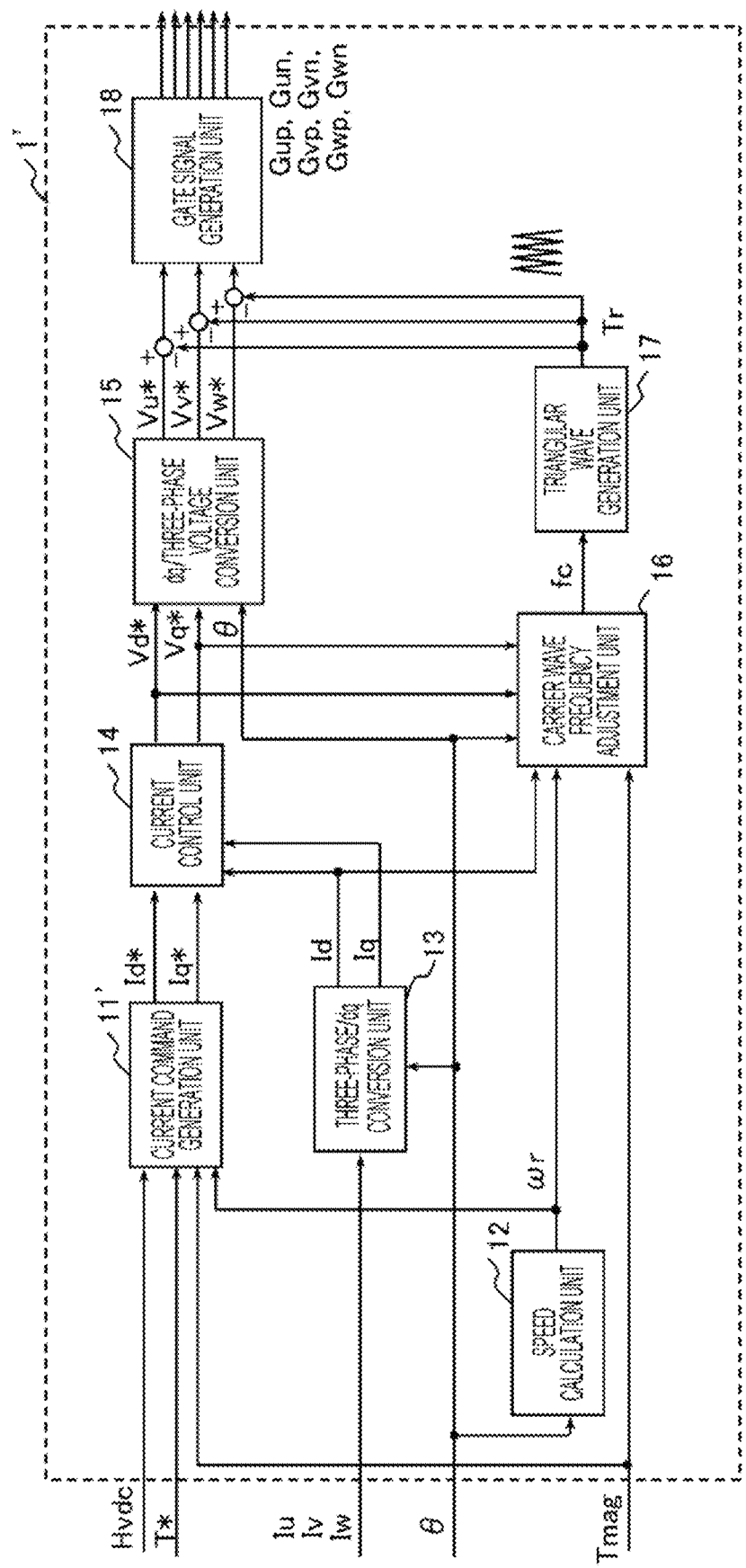
FIG. 11 is a block diagram illustrating a functional configuration of a motor control device according to a third embodiment of the present invention.

FIG. 11 is a block diagram illustrating a functional configuration of a motor control device 1' according to a third embodiment of the present invention. The motor control device 1' illustrated in FIG. 11 is different from the motor control device 1 of FIG. 2 described in the first embodiment in that a current command generation unit 11' is included instead of the current command generation unit 11. Since the other points are the same as those of the first embodiment, the description thereof will be omitted below.

Figure 12:
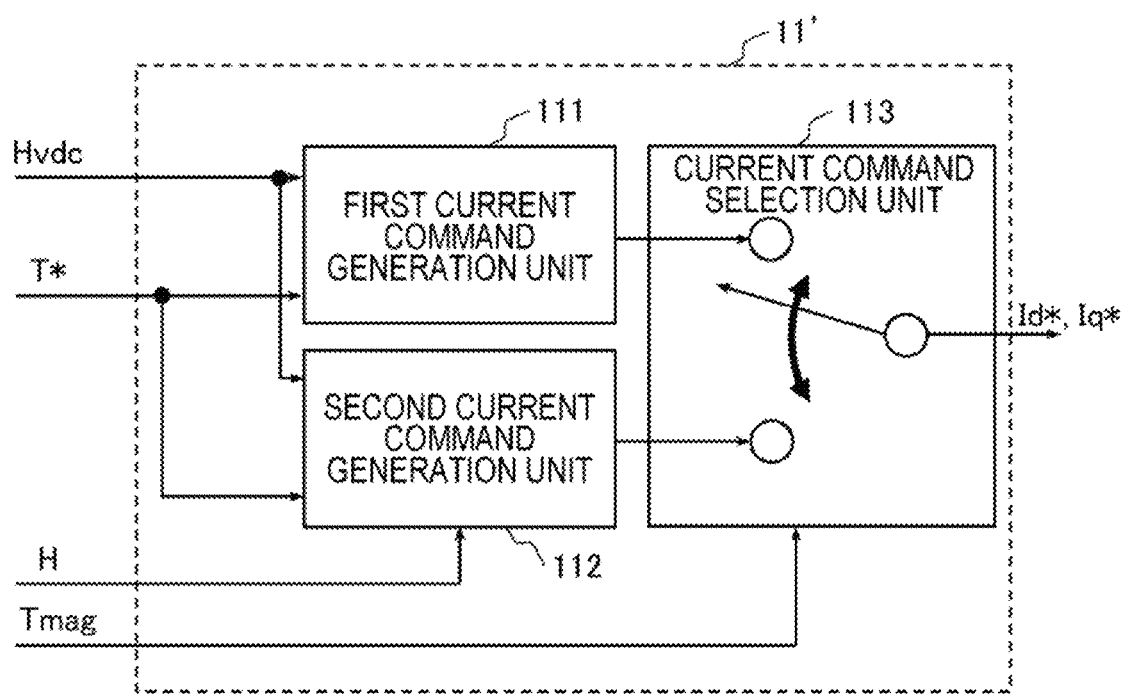
FIG. 12 is a block diagram of a current command generation unit according to the third embodiment of the present invention.

FIG. 12 is a block diagram of the current command generation unit 11' according to the third embodiment of the present invention. As illustrated in FIG. 12, the current command generation unit 11' includes a first current command generation unit 111 for normal operation, a second current command generation unit 112 for magnet temperature reduction, and a current command selection unit 113.

A power supply voltage Hvdc of a high-voltage battery 5 and a torque command T* are input to the first current command generation unit 111. The power supply voltage Hvdc, the torque command T*, and a modulation rate H are input to the second current command generation unit 112. Note that the modulation rate H represents a voltage amplitude ratio between DC power supplied from the high-voltage battery 5 to the inverter 3 and AC power output from the inverter 3 to the motor 2, and is calculated by the motor control device 1' on the basis of the following Equation (19).

$$H=\sqrt{(Vd^2+Vq^2)}/(Hvdc/2) \quad (19)$$

The magnet temperature Tmag is input to the current command selection unit 113. The current command selection unit 113 selects the current command output from the first current command generation unit 111 in a normal operation in which the magnet temperature Tmag is less than a predetermined value, and selects the current command output from the second current command generation unit 112 when the magnet temperature Tmag exceeds the predetermined value. Here, similarly to the current command generation unit 11 described in the first embodiment, the first current command generation unit 111 generates the d-axis current command Id* and the q-axis current command Iq* according to the torque command T* based on the input torque command T* and the power supply voltage Hvdc by using a preset current command map, equation, or the like. Meanwhile, the second current command generation unit 112 generates a current command as described below so that the modulation rate H falls within a predetermined range.

In the current command generation unit 11' of the present embodiment, the second current command generation unit 112 adjusts a voltage absolute value |V|(=√(Vd^2+Vq^2)) with respect to the torque to be a predetermined voltage range corresponding to the target range of the modulation rate H. The voltage absolute value |V| may be calculated, for example, from the d-axis current value Id and the q-axis current value Iq output from the three-phase/dq conversion current control unit 13 by using the above-described Equations (1) and (2).

Specifically, the second current command generation unit 112 determines a combination of the d-axis current command Id* and the q-axis current command Iq* corresponding to the torque command T* according to the following Equation (20). At that time, a combination of the d-axis current command Id* and the q-axis current command Iq* is determined such that the voltage absolute value |V| corresponding to these current commands falls within a predetermined range. Accordingly, a current operating point used in the present embodiment is derived.

$$T=p*Ke*Iq+p*(Ld-Lq)*Id*Iq \quad (20)$$

Here, Id and Iq are dq-axis currents, Ld and Lq are dq-axis inductances, p is pole pairs, and Ke is an induced voltage constant.

As described above, in the motor control device 1' according to the present embodiment, when the magnet temperature Tmag exceeds the predetermined value, the current command generation unit 11' selects the current command generated by the second current command generation unit 112 instead of the current command for the normal operation generated by the first current command generation unit 111. As a result, a d-axis interference voltage ω*Ld*Id increases due to energization of the d-axis current (weak field current) Id, and a q-axis voltage Vq decreases accordingly, so that the voltage absolute value |V| falls within a predetermined range. As a result, the modulation rate H calculated by Equation (19) can be adjusted to fall within a desired range, for example, within a predetermined range centered on 1.15. That is, when the magnet temperature Tmag of the rotor exceeds the predetermined temperature, the motor control device 1' changes the AC voltage output from the inverter 3 without changing the output torque of the motor 2 by controlling the d-axis current Id on the basis of the modulation rate H, and adjusts the voltage absolute value |V| to be within a predetermined range, and as a result, changes the modulation rate H. Thus, the modulation rate H is set within a predetermined range.

Figure 13:
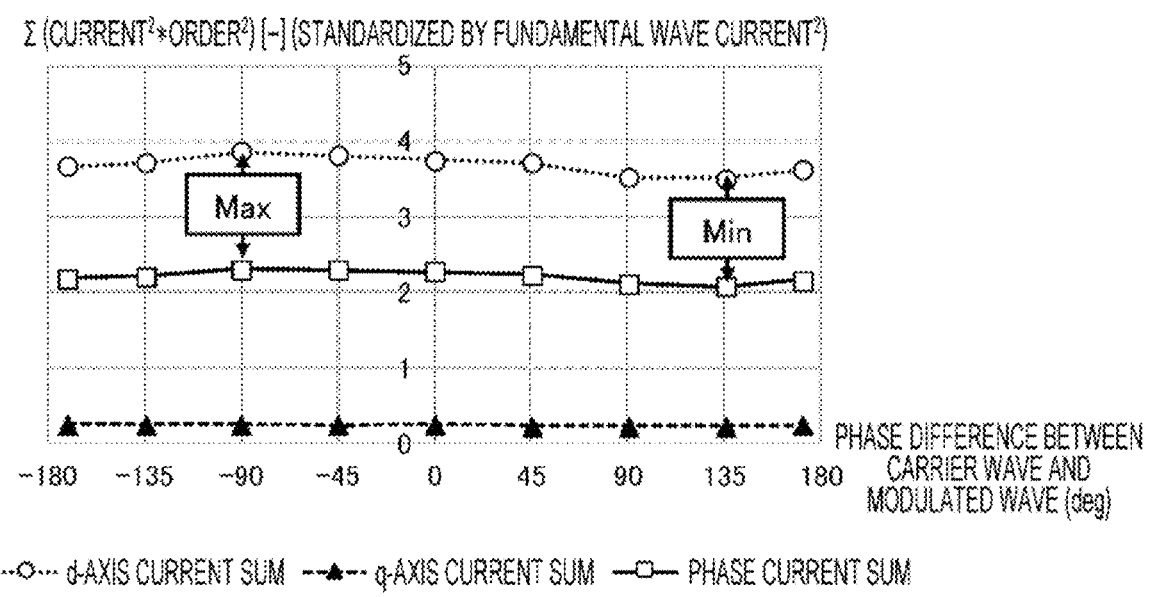
FIG. 13 is a diagram illustrating a relationship between a modulated wave/carrier wave phase difference and a d-axis current sum, a q-axis current sum, and a phase current sum.

FIG. 13 is a diagram illustrating the relationship between the modulated wave/carrier wave phase difference and the d-axis current sum, the q-axis current sum, and the phase current sum when the modulation rate is 0.8 and the frequency ratio between the carrier wave and the modulated wave is 9. Also in FIG. 13, similarly to FIG. 10 described above, the d-axis current sum is calculated by Equation (13), the q-axis current sum is calculated by $\Sigma(Iq\_n^2*n^2)$, and the phase current sum is calculated by $\Sigma(I\_n^2*n^2)$.

Also in FIG. 13, similarly to FIG. 10, when the modulated wave/carrier wave phase difference is 135 deg, the value of the d-axis current sum is minimized, and at this time, the value of the phase current sum is also minimized. Therefore, it is predicted that the magnet temperature Tmag is minimized by setting the modulated wave/carrier wave phase difference to 135 deg.

Actually, when the magnet temperature Tmag and the coil temperature rise from the reference temperature when the motor 2 is driven in the vicinity of the modulation rate of 0.8 were measured, the magnet temperature Tmag and the coil temperature rise by 97.2° C. and 88.6° C., respectively, when the modulated wave/carrier wave phase difference was 135 deg. Meanwhile, when the modulated wave/carrier wave phase difference was 90 deg, the magnet temperature Tmag was increased by 99.3° C. and the coil temperature was increased by 90.0° C., and it was confirmed that the magnet temperature Tmag was higher by 2.1° C. and the coil temperature was higher by 1.4° C. than those in the case of 135 deg.

Further, comparing the case of FIG. 13 (modulation rate 0.8) with the case of FIG. 10 (modulation rate 1.15), when the modulated wave/carrier wave phase difference is 135 deg, the magnet temperature Tmag and the coil temperature are the minimum, but when the modulation rate is 0.8, the magnet temperature Tmag is 97.2° C., which is 33.7° C. higher than when the modulation rate is 1.15 (magnet temperature Tmag is 63.5° C.). The coil temperature is 79.0° C. at the modulation rate of 0.8, which is 9.6° C. higher than that at the modulation rate of 1.15 (the coil temperature is 88.6° C.). As described above, it was confirmed that both the magnet temperature Tmag and the coil temperature greatly increase when the modulation rate is 0.8 as compared with the case where the modulation rate is 1.15.

As described above, by changing the d-axis current serving as the weak field current, it is possible to adjust the eddy current loss We by changing the voltage absolute value |V| of the AC voltage output from the inverter 3 and changing the modulation rate H accordingly while maintaining the torque output value of the motor 2. As a result, it can be seen that the eddy current loss of the magnet installed in the rotor of the motor 2 and the AC copper loss of the coil can be reduced without deteriorating the output torque and efficiency of the motor 2, and the temperature rise of the motor 2 can be suppressed.

In the present embodiment, based on the above idea, when the magnet temperature Tmag is equal to or higher than the predetermined value, the current command generation unit 11' selects the current command output from the second current command generation unit 112 so as to have a value of a predetermined modulation rate H that can suppress the eddy current loss of the magnet of the motor 2 and the AC copper loss of the coil, for example, around 1.15. Such control is further performed in addition to the adjustment of the modulated wave/carrier wave phase difference described in each of the first and second embodiments, whereby the eddy current loss of the magnet installed in the rotor of the motor 2 and the AC copper loss of the coil are significantly reduced without deteriorating the output torque and efficiency of the motor 2, and the temperature rise of the motor 2 is further suppressed.

In the present embodiment, the modulation rate, which is the ratio between the AC voltage and the DC voltage, is adjusted by energization of the d-axis current (weak field current) and kept around 1.15. However, there are several examples of changing the modulation rate, and any example may be used. An example thereof will be described below.

First, an example will be described in which the DC voltage is changed. This example is suitable for a system in which the power supply voltage Hvdc of the high-voltage battery 5 is boosted to be a DC power supply, and the modulation rate, which is the ratio of the AC voltage and the DC voltage, is changed to a desired value by changing the DC voltage. That is, the power supply voltage Hvdc output from the high-voltage battery 5 to the inverter 3 is controlled so that the modulation rate is around 1.15. Note that the modulation rate may be changed by stepping down the power supply voltage Hvdc of the high-voltage battery 5 instead of stepping up the power supply voltage Hvdc.

Next, an example in which the motor rotational speed is changed to cope with the change will be described. This example is suitable for an engine power generation system that obtains desired electric power by an engine, and freely controls a rotational speed of a generator motor to change a modulation rate, which is a ratio of an AC voltage and a DC voltage, to a desired value. That is, by changing the rotational speed of the motor, the non-interference term ($\omega^*Ld^*Id$, $\omega^*Lq^*Iq$) and the induced voltage term ($\omega^*Ke$) in the above Equations (1) and (2) are changed, and the dq-axis voltages Vd and Vq are changed. As a result, the modulation rate H represented by Equation (19) is changed to a desired value.

Note that the various methods for changing the modulation rate described above may be used alone or in combination. In the present embodiment, a desired modulation rate can be achieved by adopting an arbitrary method.

In the present embodiment, the second current command generation unit 112 adjusts the modulation rate so as to be kept around 1.15, but the modulation rate may be adjusted to another value. For example, the modulation rate can be adjusted so as to be maintained at any value of 1 to 1.27. Alternatively, when the eddy current loss of the magnet installed in the rotor of the motor 2 and the AC copper loss of the coil can be reduced, the modulation rate can be adjusted to an arbitrary value.

According to the third embodiment of the present invention described above, when the magnet temperature Tmag is higher than the predetermined temperature, the motor control device 1' changes the voltage of the AC power output from the inverter 3 based on the ratio of the voltage |V| of the AC power to the voltage Hvdc of the DC power. Specifically, the motor control device 1' includes the current command generation unit 11' that generates the d-axis current command Id* and the q-axis current command Iq* according to the torque command T*, the current control unit 14 that calculates three-phase voltage commands Vu*, Vv*, and Vw* based on the d-axis current command Id* and the q-axis current command Iq*, and the dq/three-phase voltage conversion unit 15. The current command generation unit 11' generates the d-axis current command Id* and controls the d-axis current Id or controls the voltage Hvdc of the DC power or the rotational speed ωr of the motor 2 such that the modulation rate H according to the voltage amplitude ratio between the DC power and the AC power becomes a predetermined value, for example, a predetermined value of 1 or more and 1.27 or less. With this configuration, the eddy current loss of the magnet installed in the rotor of the motor 2 and the AC copper loss of the coil can be significantly reduced, and the temperature rise of the motor 2 can be further suppressed. Therefore, it is possible to more effectively prevent the occurrence of irreversible demagnetization of the motor 2 while suppressing the switching loss of the inverter 3.

Fourth Embodiment

Next, a fourth embodiment of the present invention will be described with reference to the drawings.

Figure 14:
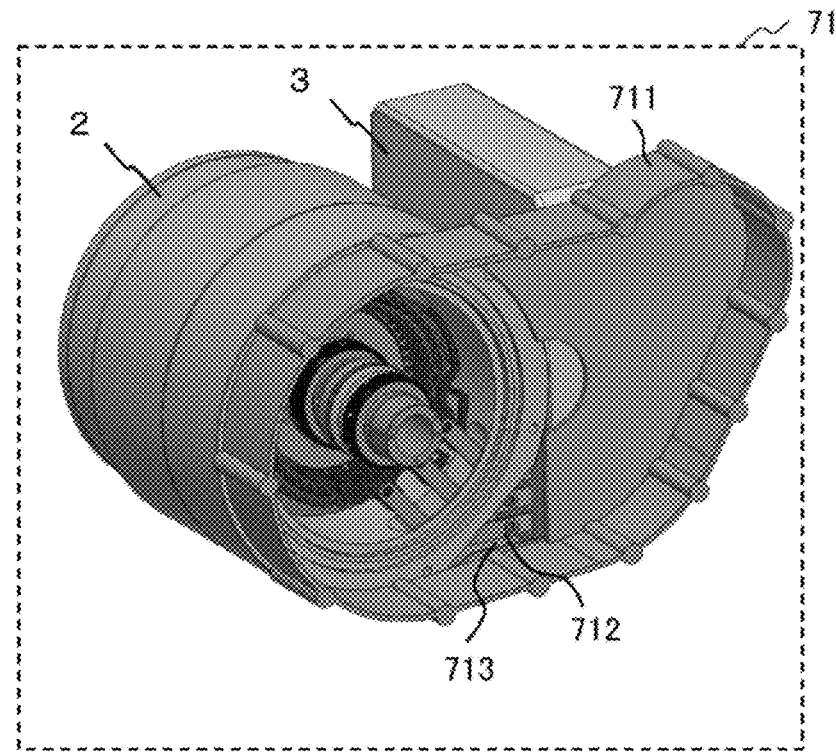
FIG. 14 is an external perspective view of a mechatronic unit according to a fourth embodiment of the present invention.

FIG. 14 is an external perspective view of a mechatronic unit 71 according to the fourth embodiment.

The mechatronic unit 71 includes the motor drive system 100 (motor control device 1 or 1', motor 2, and inverter 3) described in the first to third embodiments. The motor 2 and the inverter 3 are connected by a coupling portion 713 via a bus bar 712. The output of the motor 2 is transmitted to a differential gear (not illustrated) via a gear 711 and is transmitted to an axle. Although the motor control devices 1 and 1' are not illustrated in FIG. 14, the motor control devices 1 and 1' can be arranged at arbitrary positions.

The mechatronic unit 71 is characterized by a structure in which the motor 2, the inverter 3, and the gear 711 are integrated. In the mechatronic unit 71, due to such an integrated structure, the magnet temperature of the rotor of the motor 2 and the coil temperature of the stator of the motor 2 are deteriorated by the heat generated in the motor 2, the inverter 3, and the gear 711. However, by controlling the drive of the motor 2 using the motor control devices 1 and 1' described in the first to third embodiments, it is possible to improve the continuous rated torque while preventing the increase in the magnet temperature of the rotor, and thus, it is possible to realize a small and highly efficient mechatronic unit. Further, when the second embodiment in which the interior permanent magnet synchronous motor is used as the motor 2 is adopted, it is possible to prevent an increase in the coil temperature in addition to an increase in the magnet temperature of the rotor. Therefore, the continuous rated torque can be improved, and a small and highly efficient mechatronic unit can be realized.

Fifth Embodiment

Next, a fifth embodiment of the present invention will be described with reference to the drawings.

Figure 15:
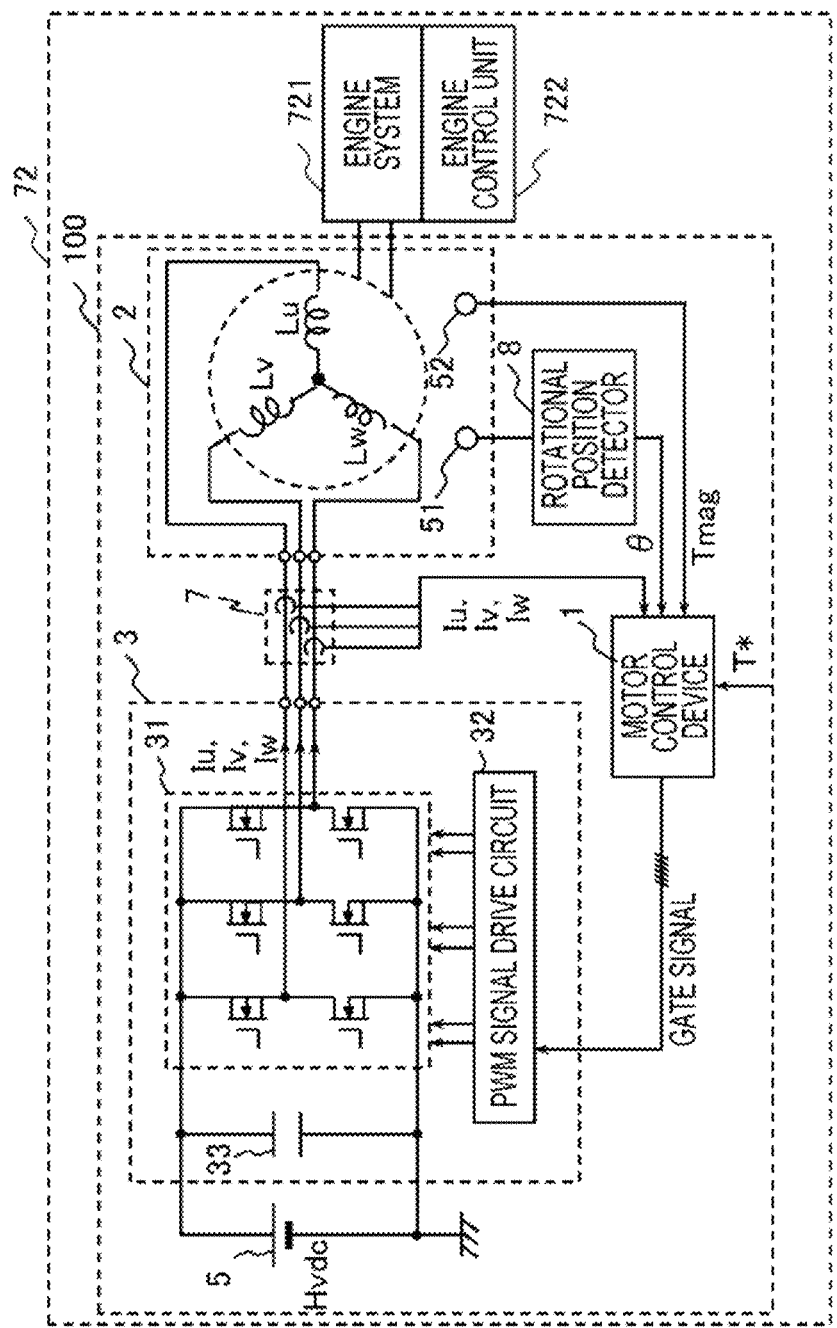
FIG. 15 is a configuration diagram of a power generation system according to a fifth embodiment of the present invention.

FIG. 15 is a configuration diagram of a power generation system 72 according to the fifth embodiment.

As illustrated in FIG. 15, the power generation system 72 includes a motor drive system 100, an engine system 721 connected to a motor 2, and an engine control unit 722. The configuration of the motor drive system 100 is similar to that in FIG. 1 described in the first embodiment, and the same reference numerals are given to the same portions, and the description thereof will be omitted.

The engine system 721 is given a command by the engine control unit 722, and is normally rotated at the most efficient rotational speed of the engine system 721. However, when the modulation rate at the DC voltage is not 1.15, the harmonic current of the dq-axis and the harmonic component of the phase current increase, and the magnet eddy current loss and the AC copper loss increase.

Therefore, in the present embodiment, by using the motor control device 1 described in the first to third embodiments, an increase in the magnet temperature of the rotor is prevented, and the engine speed is changed even when the magnet temperature is high.

According to the present embodiment, it is possible to prevent an increase in the magnet temperature of the rotor, to maintain a desired output by changing the step-up voltage of the boost converter 74 even when the magnet temperature is high, and to improve the continuous rating of a motor used in an environmentally friendly vehicle such as a hybrid vehicle or an electric vehicle. That is, it is possible to improve torque required for continuous traveling such as slope traveling at a high speed, and it is possible to stably generate driving power of an environmentally friendly vehicle such as a hybrid vehicle. In the present embodiment, the motor control device 1 has been described as a representative, but an effect can be obtained by using the motor control device 1' (third embodiment).

Sixth Embodiment

Next, a sixth embodiment of the present invention will be described with reference to the drawings.

Figure 16:
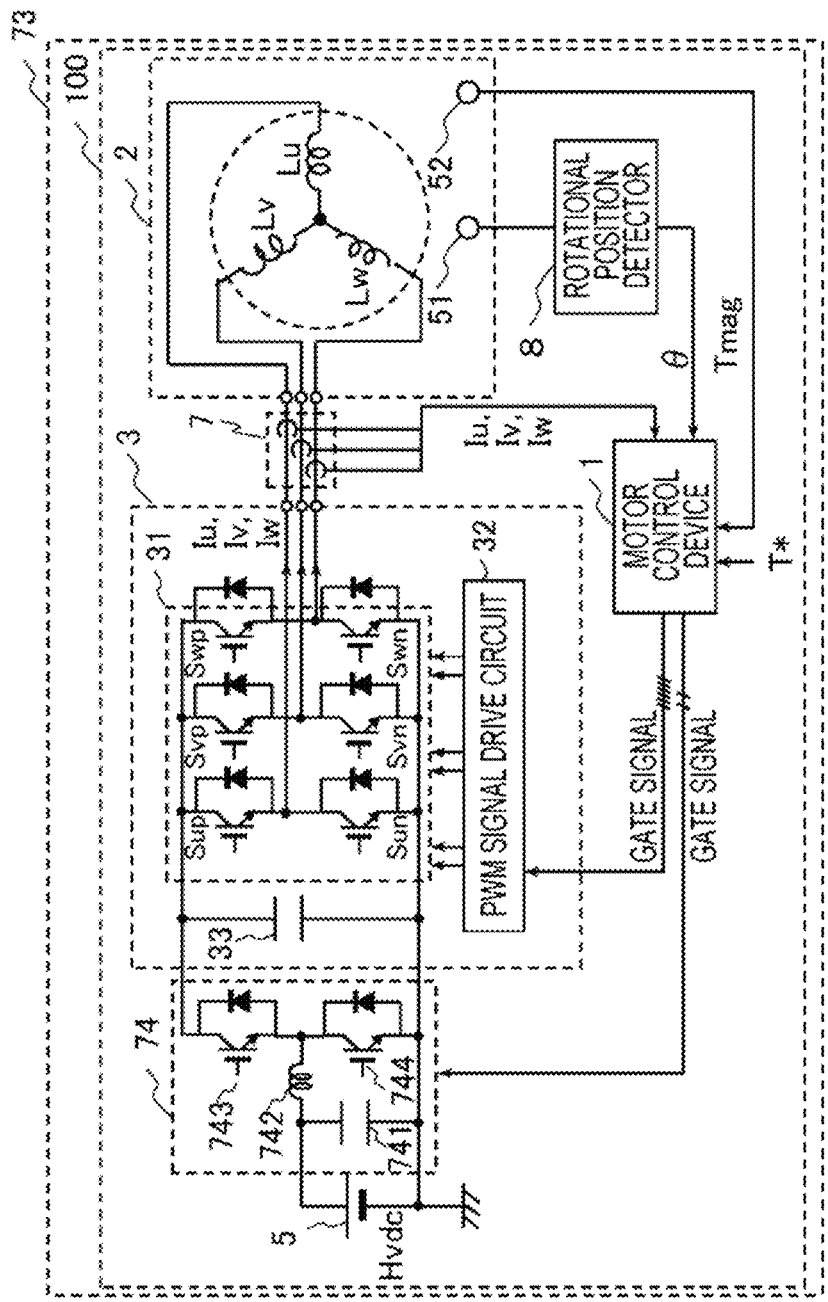
FIG. 16 is a configuration diagram of a boost converter system according to a sixth embodiment of the present invention.

FIG. 16 is a configuration diagram of a boost converter system 73 according to a sixth embodiment.

As illustrated in FIG. 16, the boost converter system 73 includes a motor drive system 100, and boosts a DC voltage of a high-voltage battery 5 or the like to a desired voltage by the boost converter 74. The configuration of the motor drive system 100 is similar to that in FIG. 1 described in the first embodiment, and the same reference numerals are given to the same portions, and the description thereof will be omitted.

In the boost converter 74, switching elements 743 and 744 are connected in series, and the high-voltage battery 5 is connected to an intermediate connection point between the switching elements 743 and 744 connected in series via a reactor 742. A capacitor 741 is connected in parallel with the high-voltage battery 5. The switching elements 743 and 744 are diode-connected.

The boost converter 74 is given a command by the motor control device 1 and boosted to the most efficient DC voltage of the boost converter system 73. However, when the modulation rate at the DC voltage is not 1.15, the harmonic current of the dq-axis and the harmonic component of the phase current increase, and the magnet eddy current loss and the AC copper loss increase.

Therefore, in the present embodiment, the DC voltage is changed by the boost converter 74 to keep the modulation rate near 1.15, similarly to the corresponding example in which the DC voltage is changed described in the third embodiment. In this way, the modulation rate is freely controlled to be around 1.15 or 1.15 or more in a region where the magnet eddy current loss and the AC copper loss are small, and the magnet eddy current loss and the AC copper loss are significantly reduced. Furthermore, at this time, as described in the first embodiment, by determining the voltage phase error $\Delta\theta v$ so that the d-axis current sum sum is minimized, the effect of reducing the magnet temperature can also be obtained. In addition, as described in the second embodiment, when the interior permanent magnet synchronous motor is used as the motor 2, the effect of reducing the coil temperature can also be obtained.

According to the present embodiment, it is possible to prevent an increase in the magnet temperature of the rotor, to maintain a desired output by changing the boosted voltage of the boost converter 74 even when the magnet temperature is high, and to continue driving of an environmentally friendly vehicle such as a hybrid vehicle or an electric vehicle. In the present embodiment, the motor control device 1 has been described as a representative, but an effect can be obtained by using the motor control device 1' (third embodiment). In addition, although it has been described that the DC voltage is changed using the boost converter 74, a similar effect can be obtained by DC voltage generation using a generator.

Seventh Embodiment

Next, an embodiment in which the motor drive system 100 is applied to a vehicle will be described with reference to FIG. 17.

Figure 17:
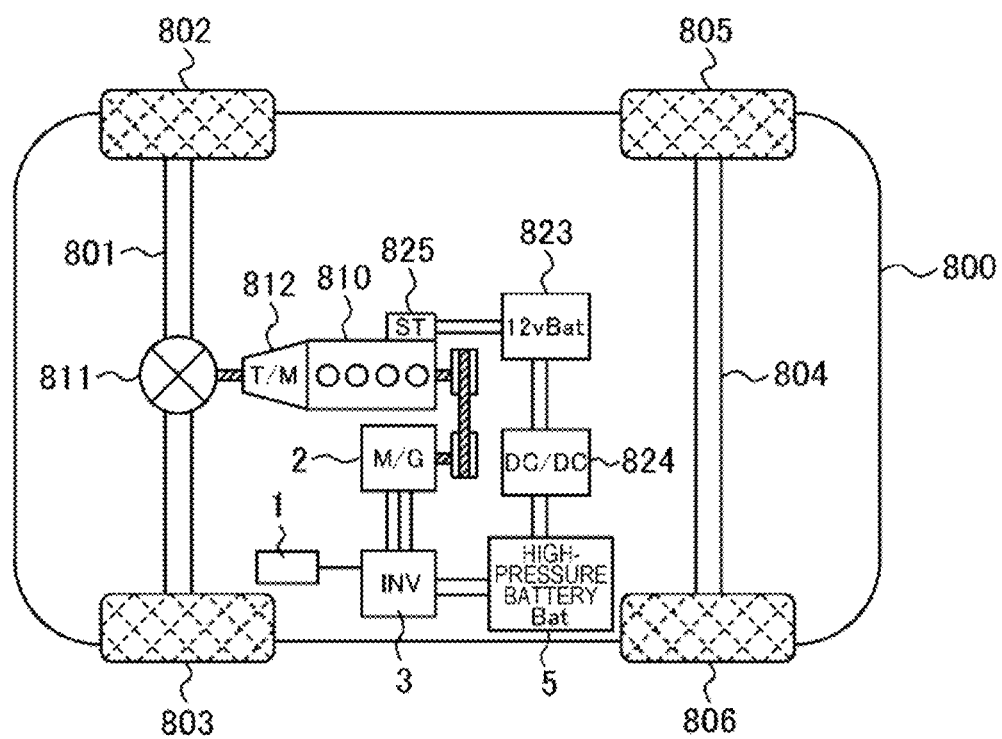
FIG. 17 is a configuration diagram of a hybrid vehicle system according to a seventh embodiment of the present invention.

FIG. 17 is a configuration diagram of a hybrid vehicle system according to the seventh embodiment of the present invention. As illustrated in FIG. 17, the hybrid vehicle system has a power train in which a motor 2 is applied as a motor/generator, and travels using rotational driving force of the motor 2. Note that not only the hybrid vehicle system but also an electric vehicle system may be used. The motor 2, an inverter 3, a high-voltage battery 5, and the like are similar to those of the motor drive system 100 in the first to third embodiments.

In the hybrid vehicle system illustrated in FIG. 17, a front wheel axle 801 is rotatably supported by a front portion of a vehicle body 800, and front wheels 802 and 803 are provided at both ends of the front wheel axle 801. A rear wheel axle 804 is rotatably supported by a rear portion of the vehicle body 800, and rear wheels 805 and 806 are provided at both ends of the rear wheel axle 804.

A differential gear 811 which is a power distribution mechanism is provided in a central portion of the front wheel axle 801, and the rotational driving force transmitted from an engine 810 via a transmission 812 is distributed to the left and right front wheel axles 801.

A pulley provided on a crankshaft of the engine 810 and a pulley provided on a rotation shaft of the motor 2 are mechanically connected via a belt. As a result, the rotational driving force of the motor 2 can be transmitted to the engine 810, and the rotational driving force of the engine 810 can be transmitted to the motor 2. In the motor 2, the three-phase AC power output from the inverter 3 is supplied to the coil of the stator in accordance with the control of the motor control device 1, whereby the rotor rotates, and a rotational driving force corresponding to the three-phase AC power is generated.

That is, while the motor 2 is controlled by the inverter 3 according to the control of the motor control device 1 to operate as an electric motor, when the rotor rotates by receiving the rotational driving force of the engine 810, electromotive force is induced in the stator coil of the stator, and the motor 2 operates as a generator that generates three-phase AC power.

The inverter 3 is a power conversion device that converts DC power supplied from the high-voltage battery 5, which is a high-voltage (42 V or 300 V) system power supply, into three-phase AC power, and controls a three-phase AC current flowing through the stator coil of the motor 2 according to the operation command value and the magnetic pole position of the rotor.

The three-phase AC power generated by the motor 2 is converted into DC power by the inverter 3 to charge the high-voltage battery 5. The high-voltage battery 5 is electrically connected to a low-voltage battery 823 via a DC-DC converter 824. The low-voltage battery 823 constitutes a low voltage (14 V) power supply of an automobile, and is used as a power supply for a starter 825 for initially starting (cold starting) the engine 810, a radio, lights, and the like.

When the vehicle is at a stop such as waiting for a traffic light (idle stop mode), the engine 810 is stopped, and when the engine 810 is restarted (hot start) at the time of re-departure, the motor 2 is driven by the inverter 3 to restart the engine 810. In the idle stop mode, when the amount of charge of the high-voltage battery 5 is insufficient or when the engine 810 is not sufficiently warmed, the engine 810 is not stopped and continues to be driven. Further, during the idle stop mode, it is necessary to secure a drive source of auxiliary machines using the engine 810 as a drive source, such as a compressor of an air conditioner. In this case, the motor 2 is driven to drive the auxiliary machines.

Even in the acceleration mode or the high load operation mode, the motor 2 is driven to assist the driving of the engine 810. On the other hand, in the charging mode in which the high-voltage battery 5 needs to be charged, the engine 810 causes the motor 2 to generate power to charge the high-voltage battery 5. That is, regeneration is performed at the time of braking, deceleration, or the like of the vehicle.

According to the present embodiment, the hybrid vehicle system of FIG. 17 is realized using the motor drive system 100 described in the first to third embodiments. In this hybrid vehicle system, as described in the first embodiment, the voltage phase error $\Delta\theta v$ is determined so that the d-axis current sum sum is minimized, whereby the effect of reducing the magnet temperature can be obtained. In addition, as described in the second embodiment, when the interior permanent magnet synchronous motor is used as the motor 2, the effect of reducing the coil temperature can also be obtained. Furthermore, as described in the fourth embodiment, by boosting the DC voltage to a modulation rate of about 1.15 or 1.15 or more, it is also possible to further reduce the magnet eddy current loss and the AC copper loss while maintaining the output of the motor 2. As a result, the eddy current loss of the rotor magnet can be reduced, and the continuous rating of the motor used in an environmentally friendly vehicle such as an electric vehicle or a hybrid vehicle can be improved. That is, it is possible to improve torque required for continuous traveling such as traveling on a slope at a high speed. Although the motor control device 1 has been described as a representative in the present embodiment, it is also possible to obtain an effect by using the motor control device 1' (third embodiment).

Note that, in each of the above embodiments, each configuration (FIGS. 2 to 4, or the like) in the motor control devices 1 and 1' may implement the function of each configuration by a CPU and a program, regardless of the configuration by hardware. In a case where each configuration in the motor control devices 1 and 1' is realized by the CPU and the program, there is an advantage that the cost can be reduced because the number of pieces of hardware is reduced. In addition, this program can be provided by being stored in advance in a storage medium of the motor control device. Alternatively, the program may be stored and provided in an independent storage medium, or the program may be recorded and stored in a storage medium of the motor control device via a network line. Various forms of computer-readable computer program products, such as data signals (carrier waves), may be provided.

The present invention is not limited to the above embodiments, and other forms conceivable within the scope of the technical idea of the present invention are also included within the scope of the present invention as long as the features of the present invention are not impaired. In addition, a configuration in which the plurality of embodiments described above are combined may be adopted.

REFERENCE SIGNS LIST 1, 1' motor control device
2 permanent magnet synchronous motor (motor)
3 inverter
5 high-voltage battery
7 current detection unit
8 rotational position detector
11, 11' current command generation unit
12 speed calculation unit
13 three-phase/dq conversion unit
14 current control unit
15 dq/three-phase voltage conversion unit
16 carrier wave frequency adjustment unit
17 triangular wave generation unit
18 gate signal generation unit
31 inverter circuit
32 PWM signal drive circuit
33 smoothing capacitor 51 rotational position sensor
52 temperature sensor
71 mechatronic unit
72 power generation system
73 boost converter system
74 boost converter
100 motor drive system
111 first current command generation unit
112 second current command generation unit
113 current command selection unit
161 synchronous PWM carrier waver number selection unit
162 voltage phase calculation unit
163 voltage phase error calculation unit
164 synchronous carrier wave frequency calculation unit
165 carrier wave frequency setting unit
711 gear
712 bus bar
713 coupling portion
721 engine system
722 engine control unit
741 capacitor
742 reactor
743, 744 switching element
800 vehicle body
801 front wheel axle
802 front wheel
803 front wheel
804 rear wheel axle
805 rear wheel
806 rear wheel
810 engine
811 differential gear
812 transmission
823 low-voltage battery
824 DC-DC converter
825 starter
1631 reference voltage phase calculation unit
1632 d-axis current sum calculation unit
1633 fixed triangular wave phase determination unit
1634 addition unit
1635 subtraction unit

The invention claimed is:

1. A motor control device connected to a power converter for converting power from DC power to AC power, and controlling driving of an AC motor driven using the AC power, the motor control device comprising:
a carrier wave generation unit that generates a carrier wave;
a carrier wave frequency adjustment unit that adjusts a frequency of the carrier wave; and
a gate signal generation unit that performs pulse width modulation on a voltage command according to a torque command using the carrier wave and generates a gate signal for controlling an operation of the power converter,
wherein the carrier wave frequency adjustment unit:
extracts a d-axis current for one electrical angle cycle based on a rotational speed of the AC motor,
calculates, for the d-axis current for one electrical angle cycle extracted, one of a total value of a product of a square of each harmonic of the d-axis current and a square of an order thereof, a total value of a product of each harmonic of the d-axis current and an order thereof, a total value of a square of each harmonic of the d-axis current, or a total value of each harmonic of the d-axis current, and determines a carrier wave phase difference based on the total value adjusts a phase difference between the voltage command and the carrier wave based on the carrier wave difference determined, wherein the phase difference is adjusted to reduce an eddy current loss generated in a magnet of a rotor of the AC motor.

2. The motor control device according to claim 1, wherein the carrier wave frequency adjustment unit further determines the carrier wave phase difference for reducing the eddy current loss based on the d-axis current and the rotational speed of the AC motor, and adjusts the phase difference by adjusting a phase of the carrier wave using the determined carrier wave phase difference.

3. The motor control device according to claim 1, wherein the carrier wave frequency adjustment unit has a storage area in which the carrier wave phase difference for reducing the eddy current loss is stored in advance, and adjusts the phase difference by adjusting a phase of the carrier wave using the carrier wave phase difference stored in the storage area.

4. A motor control device connected to a power converter for converting power from DC power to AC power, and controlling driving of an AC motor driven using the AC power, the motor control device comprising:
a carrier wave generation unit that generates a carrier wave;
a gate signal generation unit that performs pulse width modulation on a voltage command according to a torque command using the carrier wave and generates a gate signal for controlling an operation of the power converter, and
a carrier wave frequency adjustment unit that adjusts a frequency of the carrier wave, wherein the carrier wave frequency adjustment unit:
adjusts a phase difference between the voltage command and the carrier wave when a temperature of a magnet exceeds a predetermined temperature, wherein the phase difference is adjusted to reduce an eddy current loss generated in the magnet of a rotor of the AC motor according to a d-axis current applied to the AC motor and a rotational speed of the AC motor,
wherein the temperature of the magnet is acquired by acquiring a detection result of the temperature of the magnet from a temperature sensor that detects the temperature of the magnet or estimating the temperature of the magnet based on temperature dependency of an induced voltage of the AC motor, and
wherein a voltage of the AC power is changed based on a ratio of the voltage of the AC power to a voltage of the DC power when the temperature of the magnet is higher than the predetermined temperature.

5. The motor control device according to claim 4, wherein the carrier wave frequency adjustment unit further adjusts the phase difference when the temperature of the magnet is lower than the predetermined temperature so that the phase difference is set to a predetermined value.

6. The motor control device according to claim 4, further comprising:
a current command generation unit that generates a d-axis current command and a q-axis current command according to the torque command; and
a current control unit that calculates the voltage command based on the d-axis current command and the q-axis current command,
wherein the current command generation unit generates the d-axis current command and controls the d-axis current so that a modulation rate according to a voltage amplitude ratio between the DC power and the AC power becomes a predetermined value.

7. The motor control device according to claim 6, wherein the predetermined value of the modulation rate is 1 or more and 1.27 or less.

8. The motor control device according to claim 4, wherein the voltage of the DC power or the rotational speed of the AC motor is controlled such that a modulation rate according to a voltage amplitude ratio between the DC power and the AC power becomes a predetermined value.

9. The motor control device according to claim 1, wherein the carrier wave frequency adjustment unit adjusts the frequency of the carrier wave so that the frequency of the carrier wave becomes an integral multiple of a frequency of the voltage command.

10. The motor control device according to claim 9, wherein the integral multiple is a multiple of 3.

11. The motor control device according to claim 1, wherein the AC motor is a surface permanent magnet synchronous motor in which the magnet is attached to a surface of the rotor, or an interior permanent magnet synchronous motor in which the magnet is embedded in the rotor.

12. A mechatronic unit comprising:
the motor control device according to claim 1;
the power converter connected to the motor control device;
the AC motor driven by the power converter; and
a gear that transmits a rotational driving force of the AC motor,
wherein the AC motor, the power converter, and the gear are integrated.

13. A power generation system comprising:
the motor control device according to claim 1;
the power converter connected to the motor control device;
the AC motor driven by the power converter; and
an engine system connected to the AC motor.

14. A boost converter system comprising:
the motor control device according to claim 1;
the power converter connected to the motor control device;
the AC motor driven by the power converter; and
a boost converter that boosts a voltage of the DC power.

15. An electric vehicle system comprising:
the motor control device according to claim 1;
the power converter connected to the motor control device; and
the AC motor driven by the power converter,
wherein the electric vehicle system travels using a rotational driving force of the AC motor.

* * * * *